(12) United States Patent
Wishneski et al.

(10) Patent No.: US 9,592,516 B2
(45) Date of Patent: Mar. 14, 2017

(54) POLYURETHANE SPRAYING SYSTEM USED TO MINIMIZE EMISSIONS OF A POLYISOCYANATE

(71) Applicant: BASF SE, Ludwigshafen (DE)

(72) Inventors: Todd William Wishneski, Missouri City, TX (US); Joseph Ogonowski, Newport, MI (US); Mario Jean-Rejouis, Houston, TX (US); Marcus Hunter, Cypress, TX (US)

(73) Assignee: BASF SE, Ludwigshafen (DE)

( * ) Notice: Subject to any disclaimer, the term of this patent is extended or adjusted under 35 U.S.C. 154(b) by 136 days.

(21) Appl. No.: 13/729,540

(22) Filed: Dec. 28, 2012

(65) Prior Publication Data
US 2013/0119152 A1    May 16, 2013

Related U.S. Application Data

(63) Continuation-in-part of application No. 12/877,411, filed on Sep. 8, 2010, now Pat. No. 8,828,495.
(Continued)

(51) Int. Cl.
*B05B 7/00* (2006.01)
*B05B 7/16* (2006.01)
(Continued)

(52) U.S. Cl.
CPC ............ *B05B 1/04* (2013.01); *B05B 1/042* (2013.01); *B05B 1/06* (2013.01); *B29B 7/325* (2013.01);
(Continued)

(58) Field of Classification Search
USPC ........ 118/300, 302, 666, 667; 239/597, 592, 239/589, 601
See application file for complete search history.

(56) References Cited

U.S. PATENT DOCUMENTS 3,215,652 A    11/1965    Kaplan
3,297,597 A    1/1967    Edwards et al.
(Continued)

OTHER PUBLICATIONS

Handbook: "Optimizing Your Spray System", Spraying Systems Co., TM410, 2003, 51 pages.
(Continued)

*Primary Examiner* — Yewebdar Tadesse
(74) *Attorney, Agent, or Firm* — Howard & Howard Attorneys PLLC

(57) ABSTRACT

A polyurethane spraying system minimizes emissions of a polyisocyanate while spraying a mixture of a polyisocyanate and a resin composition onto a surface. The system includes a first reactant supply tank including the resin composition. The system also includes a second reactant supply tank including the polyisocyanate. The system further includes a non-gaseous pump that is coupled with the first and second reactant supply tanks, a mixing apparatus that is coupled with the first and second reactant supply tanks for mixing the resin composition and the polyisocyanate prior to spraying, and a particular spray nozzle that is coupled with the mixing apparatus. The polyurethane spraying system produces less than 50 parts of the polyisocyanate per one billion parts of air according to the NIOSH 5521 Impingement Method while spraying the mixture onto the surface.

21 Claims, 10 Drawing Sheets

Related U.S. Application Data

(60) Provisional application No. 61/240,513, filed on Sep. 8, 2009.

(51) Int. Cl.
| | |
|---|---|
| *B05B 1/04* | (2006.01) |
| *B05B 1/06* | (2006.01) |
| *B29B 7/32* | (2006.01) |
| *B29B 7/74* | (2006.01) |
| *C08G 18/48* | (2006.01) |
| *C08G 18/50* | (2006.01) |
| *C08G 18/40* | (2006.01) |
| *C08G 18/42* | (2006.01) |
| *C08G 101/00* | (2006.01) |
| *B05D 1/34* | (2006.01) |
| *B05D 1/02* | (2006.01) |

(52) U.S. Cl.
CPC .......... *B29B 7/7404* (2013.01); *B29B 7/7433* (2013.01); *B29B 7/7447* (2013.01); *C08G 18/4018* (2013.01); *C08G 18/4208* (2013.01); *C08G 18/4883* (2013.01); *C08G 18/5033* (2013.01); *B05D 1/02* (2013.01); *B05D 1/34* (2013.01); *B05D 2503/00* (2013.01); *C08G 2101/0025* (2013.01); *C08G 2150/50* (2013.01); *C08G 2150/60* (2013.01)

(56) References Cited

U.S. PATENT DOCUMENTS

| | | | |
|---|---|---|---|
| 3,754,710 A * | 8/1973 | Chimura | 239/597 |
| 3,927,539 A | 12/1975 | Harkison | |
| 3,954,544 A * | 5/1976 | Hooker | 156/356 |
| 4,021,386 A | 5/1977 | Lindstrom | |
| 4,072,623 A | 2/1978 | Hayden et al. | |
| 4,137,265 A | 1/1979 | Edwards | |
| 4,362,489 A | 12/1982 | Bast | |
| 4,438,056 A | 3/1984 | Bast | |
| 5,009,367 A * | 4/1991 | Nielsen | 239/3 |
| 5,337,958 A | 8/1994 | Hennessy et al. | |
| 5,409,961 A | 4/1995 | Green | |
| 5,430,071 A | 7/1995 | Green et al. | |
| 5,447,964 A | 9/1995 | Green et al. | |
| 5,449,699 A | 9/1995 | Green | |
| 5,451,614 A | 9/1995 | Green et al. | |
| 5,455,283 A | 10/1995 | Green et al. | |
| 5,470,891 A | 11/1995 | Green et al. | |
| 5,488,072 A | 1/1996 | Green | |
| 5,552,447 A | 9/1996 | Green | |
| 5,553,783 A | 9/1996 | Slavas et al. | |
| 6,326,413 B1 | 12/2001 | Blackwell et al. | |
| 6,495,722 B1 | 12/2002 | Zimmerman et al. | |
| 6,534,556 B2 | 3/2003 | Lacarte et al. | |
| 6,924,321 B2 | 8/2005 | Casati et al. | |
| 2006/0192033 A1* | 8/2006 | Dansizen et al. | 239/414 |
| 2006/0278161 A1* | 12/2006 | Burkholder et al. | 118/323 |
| 2007/0224358 A1* | 9/2007 | Insausti-Eciolaza et al. | 427/407.1 |
| 2009/0230221 A1* | 9/2009 | Ballu | 239/597 |
| 2012/0009407 A1* | 1/2012 | Peeler et al. | 428/220 |

OTHER PUBLICATIONS

Article: Bilan et al., "Assessment of Isocyanate Exposure during the Spray Application of Polyurethane Foam", American Industrial Hygiene Association, Jun. 1989, No. 50, (6), pp. 303-306.
Article: Karoly et al., "Worker's Exposure to Methylene Diphenyl Diisocyanate (MDI) during the Application of Spray Polyurethane . . . ", Polyurethanes Expo—Oct. 2003, pp. 25-30.
Article: Lesage et al., "Airborne Methylene Diphenyl Diisocyanate (MDI) Concentrations Associated with the Application of Polyurethane . . . ", Journal of Occupational and Environmental Hygiene, Feb. 2007, No. 4, pp. 145-155.
Flyer: "VeeJet Spray Nozzles", Spraying Systems Co. extracted from www.chemicalcontainers.com database on Jan. 7, 2009, 2 pages.

* cited by examiner

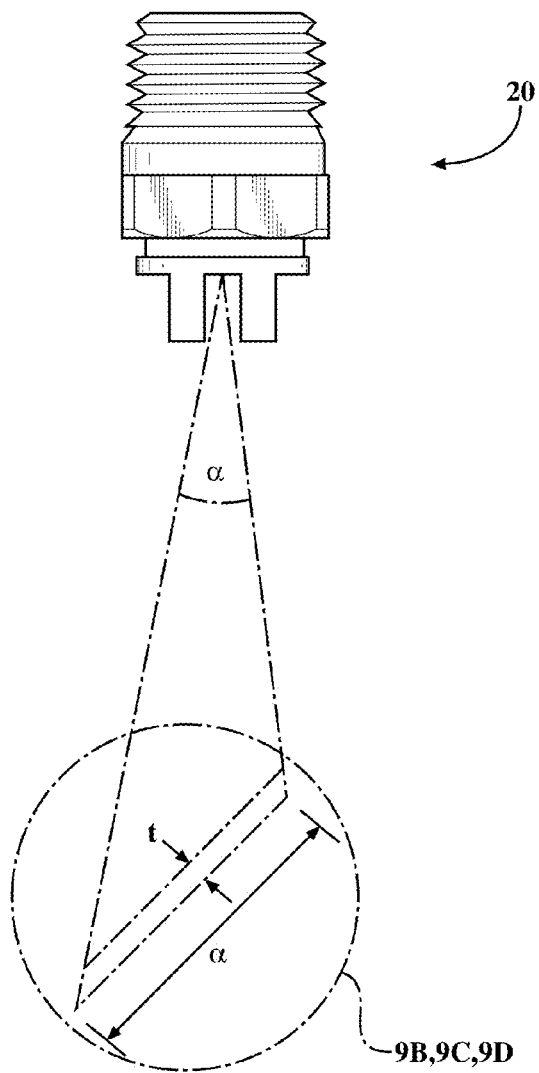
FIG. 9A
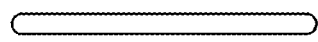  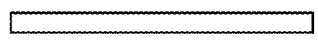  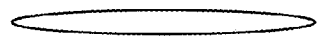
FIG. 9B  FIG. 9C  FIG. 9D

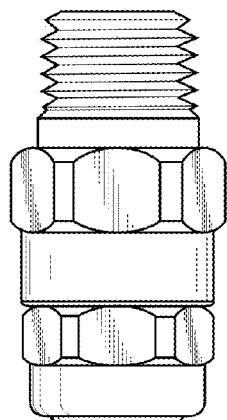
FIG. 10A
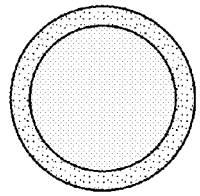 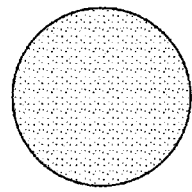
FIG. 10B    FIG. 10C
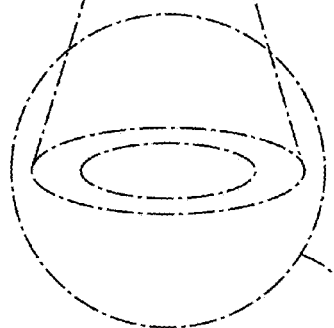
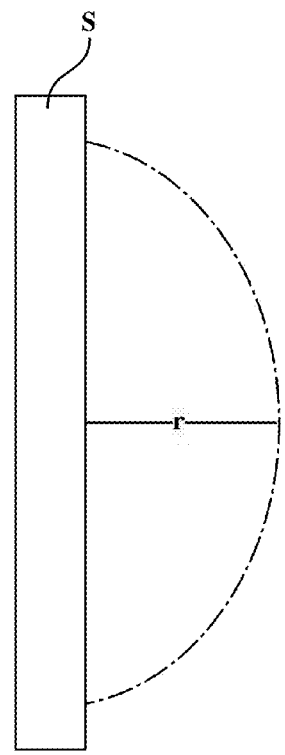
FIG. 11

POLYURETHANE SPRAYING SYSTEM USED TO MINIMIZE EMISSIONS OF A POLYISOCYANATE

RELATED APPLICATIONS

This application is a continuation-in-part of U.S. application Ser. No. 12/877,411, filed on Sep. 8, 2010, which claims priority to and all the benefits of U.S. Provisional Patent Application Ser. No. 61/240,513, filed on Sep. 8, 2009, the entire specifications of which are expressly incorporated herein by reference.

FIELD OF THE DISCLOSURE

The present disclosure generally relates to polyurethane spraying system used to minimize emissions of a polyisocyanate. More specifically, the system utilizes particular chemistry and a non-gaseous pump to spray a mixture of a polyisocyanate and a resin composition onto a surface.

DESCRIPTION OF THE RELATED ART

It is well known in the art that various hydrofluorocarbons have been investigated as blowing agents for polyurethane based foams due to their low ozone depletion potentials. Some hydrofluorocarbons are used in sprayable polyurethane systems to form polyurethane foams that exhibit improved cell structure and that can be processed at a low temperature ranges. These polyurethane foams also resist excessive creep and exhibit improved dimensional stability as compared to their counterparts.

However, to form these foams and utilize the sprayable froth polyurethane systems, polyisocyanates and polyols must be sprayed onto surfaces, thereby generating potentially dangerous emissions. Amounts of emissions are typically dependent on a physical nature of a component being sprayed, work practices, environmental conditions (e.g. temperature, ventilation, and air flow). Polyisocyanates are believed to cause irritation and sensitization of eyes, skin, and respiratory systems upon contact and with repeated exposure. As a result, the Occupational Safety and Health Administration (OSHA) has set Permissible Exposure Limits (PELs) for polyisocyanates. These limits are not supposed to be exceeded at any time in a workspace. The PEL for methylene diphenyl diisocyanate (MDI) is 0.2 mg/m$^3$ (~20 ppb). In addition, the American Conference of Governmental Industrial Hygienists (ACGIH) has established Threshold Limit Values (TLVs) for airborne concentrations of polyisocyanates to which a worker may be consistently exposed for an eight hour period with no adverse health effects. The ACGIH TLV for MDI is 0.051 mg/m$^3$ (~5 ppb). Many methods used to measure MDI emissions are the result of industrial hygiene practices and hands on experience by the industry Trade Associations (e.g. III, CPI and the Diisocyanate Panel of the ACC). Typically, a modification of the OSHA method 47, using impingers backed up with 13 mm filters, can be used and can allow greater sensitivity and capture of the aerosol, both in the impinger and filter, for subsequent analysis.

Typical sprayable froth polyurethane systems produce amounts of polyisocyanates in the air that exceed both the established PELs and TLVs thus requiring use of respirators, expensive engineering controls, and other protective equipment. Accordingly, there remains an opportunity to develop an improved polyurethane system.

SUMMARY OF THE DISCLOSURE AND ADVANTAGES

The instant disclosure provides a polyurethane spraying system used to minimize emissions of the polyisocyanate while spraying the mixture onto the surface. The system includes a first reactant supply tank including the resin composition and a second reactant supply tank including the polyisocyanate. The system also includes a non-gaseous pump that is coupled with the first and second reactant supply tanks. The system further includes a mixing apparatus that is coupled with the first and second reactant supply tanks for mixing the resin composition and the polyisocyanate prior to spraying. Still further, the system includes a spray nozzle that is coupled with the mixing apparatus and that minimizes emissions of the polyisocyanate while the mixture is sprayed onto the surface.

The spray nozzle includes a nozzle body having a longitudinal axis, upstream and downstream ends opposite each other, and a passage defined by said nozzle body and in fluid communication with said upstream and downstream ends along said longitudinal axis for receiving the mixture. The spray nozzle also includes a spraying orifice defined by the nozzle body and disposed at the downstream end of the nozzle body transverse to the longitudinal axis for spraying the mixture at a spray angle corresponding to a control spray angle of from 15 to 125 degrees measured at a pressure of from 10 to 40 psi using water as a standard.

The polyisocyanate and the resin composition of this disclosure react to form a polyurethane foam that cures faster than conventional sprayed foams and that has a minimized ozone depleting potential, thus increasing environmental friendliness. The spray nozzle used to spray the mixture of the polyisocyanate and the resin composition minimizes emissions of the polyisocyanate generated by spraying the mixture and allows the mixture to be sprayed in closed and/or non-ventilated environments with minimized risk of over exposure to the polyisocyanate. The spray nozzle and method of this disclosure also minimize a need to use respirators and protective equipment when spraying the mixture due to the minimized emissions of the polyisocyanate. Furthermore, the spray nozzle also allows for effective and efficient distribution of the mixture thereby reducing overspray and waste.

BRIEF DESCRIPTION OF THE SEVERAL VIEWS OF THE DRAWINGS

Other advantages of the present disclosure will be readily appreciated, as the same becomes better understood by reference to the following detailed description when considered in connection with the accompanying drawings wherein:

FIG. 1b is a perspective view of the spray nozzle of FIG. 1a;

FIG. 2b is a perspective view of the spray nozzle of FIG. 2a;

FIG. 3b is a perspective view of the spray nozzle of FIG. 3a;

FIG. 4b is a perspective view of the spray nozzle of FIG. 4a;

FIG. 6b is a first perspective view of the spray nozzle of FIG. 6a;

FIG. 6c is a second perspective view of the spray nozzle of FIG. 6a;

FIG. 7b is a first perspective view of the spray nozzle of FIG. 7a;

FIG. 7c is a second perspective view of the spray nozzle of FIG. 7a;

FIG. 9a is a side plan view of one embodiment of a flat fan spray nozzle of this disclosure and illustrates a flat spray pattern that is substantially planar;

FIG. 9b is a magnified view of one embodiment of the flat spray pattern that is substantially planar and that is deflected;

FIG. 9c is a magnified view of a second embodiment of the flat spray pattern that is substantially planar and that has an even distribution;

FIG. 9d is a magnified view of a third embodiment of the flat spray pattern that is substantially planar and that is tapered;

FIG. 10a is a side plan view of one embodiment of a conical spray nozzle of this disclosure and illustrates a conical spray pattern;

FIG. 10b is a magnified view of one embodiment of the conical spray pattern that is a hollow cone;

FIG. 10c is a magnified view of one embodiment of the conical spray pattern that is a full cone;

FIG. 11 is a side plan view of a surface and a semicircle emanating from the surface and having a radius of three feet within which an amount of emissions is determined using the NIOSH 5521 Impingement Method;

DETAILED DESCRIPTION OF THE DISCLOSURE

Figure 1A:
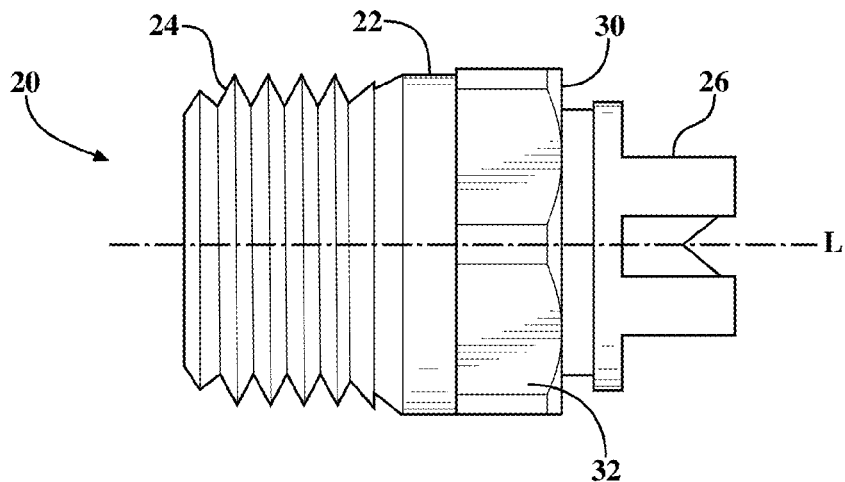
FIG. 1a is a side plan view of one embodiment of the spray nozzle of this disclosure that produces a flat spray pattern.
Figure 1B:
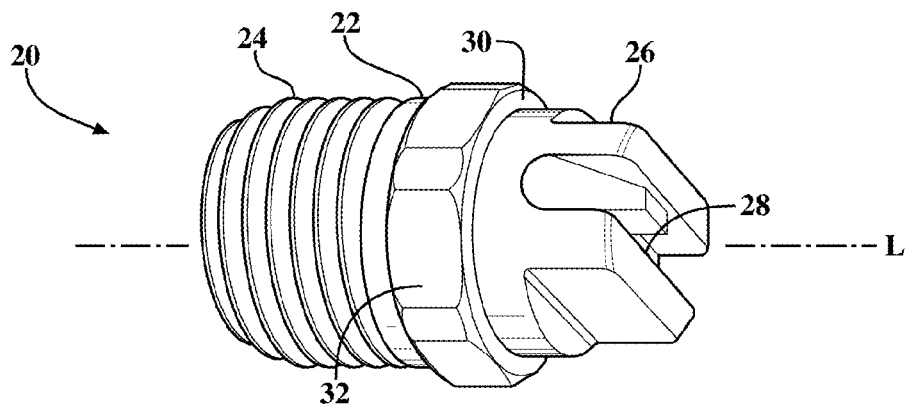
Figure 2A:
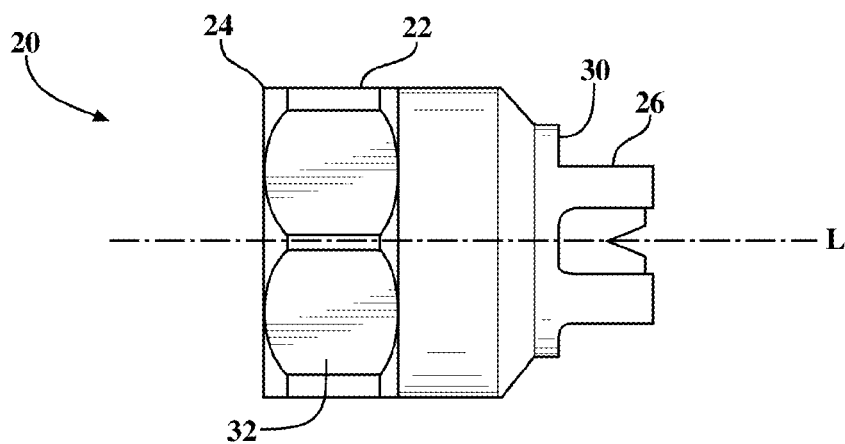
FIG. 2a is a side plan view of a second embodiment of the spray nozzle of this disclosure that produces a flat spray pattern.
Figure 2B:
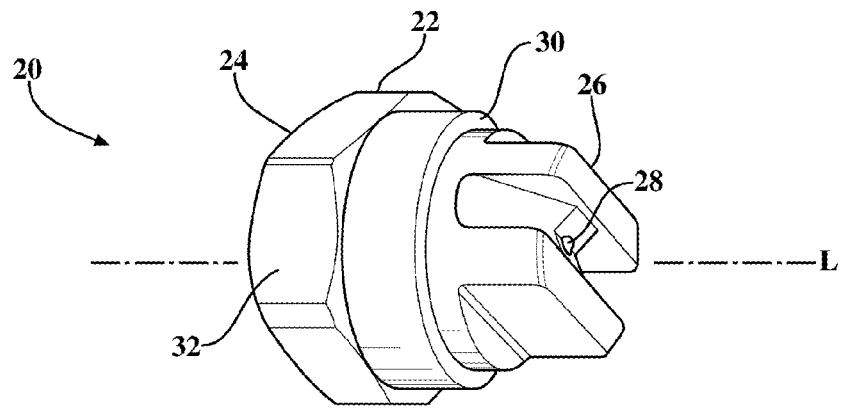
Figure 3A:
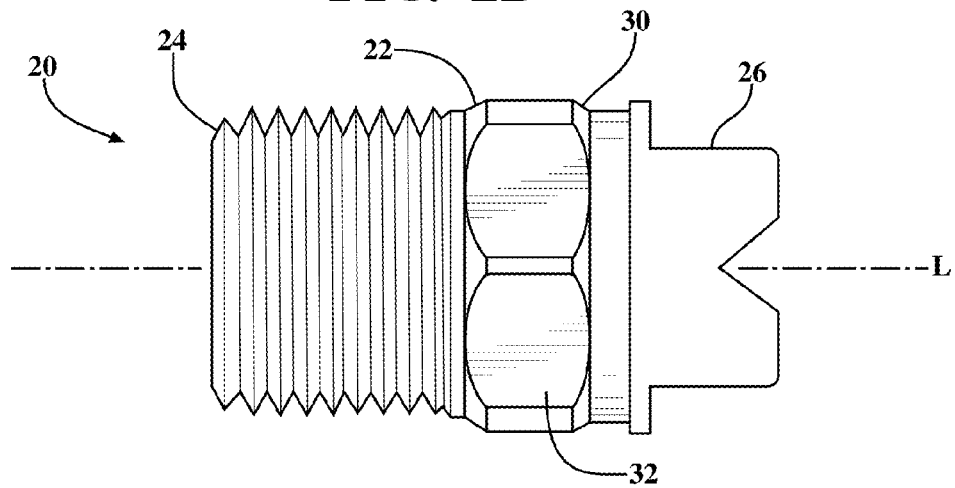
FIG. 3a is a side plan view of a third embodiment of the spray nozzle of this disclosure that produces a flat spray pattern.
Figure 3B:
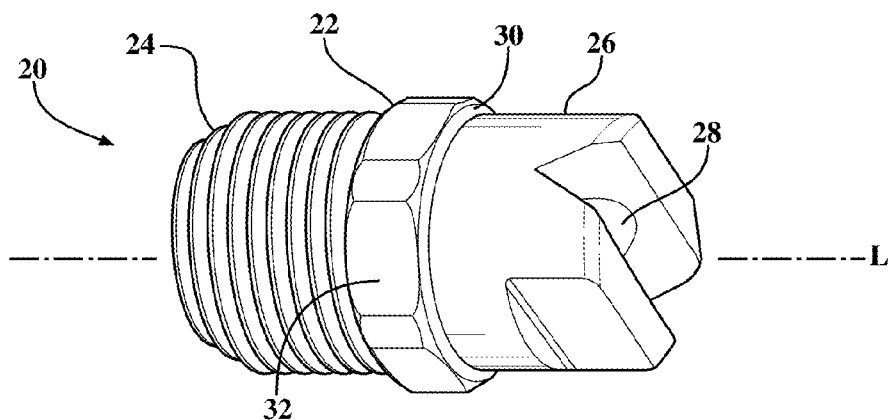
Figure 4A:
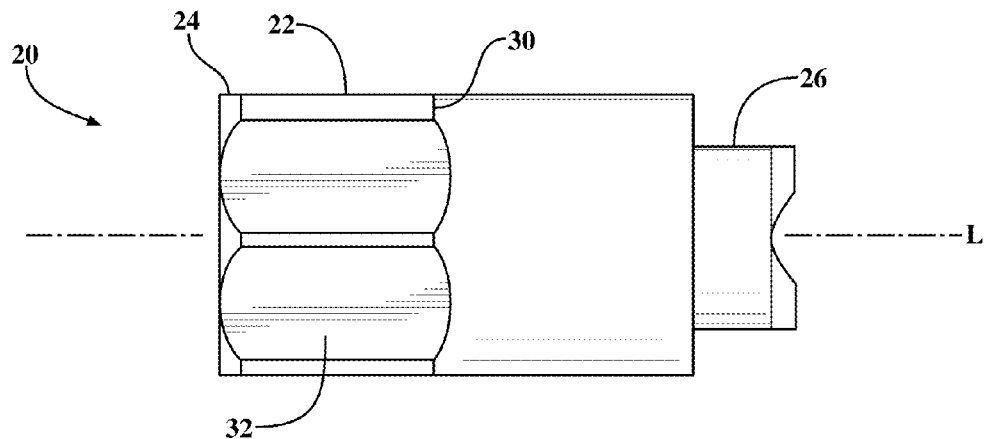
FIG. 4a is a side plan view of a fourth embodiment of the spray nozzle of this disclosure that produces a flat spray pattern.
Figure 4B:
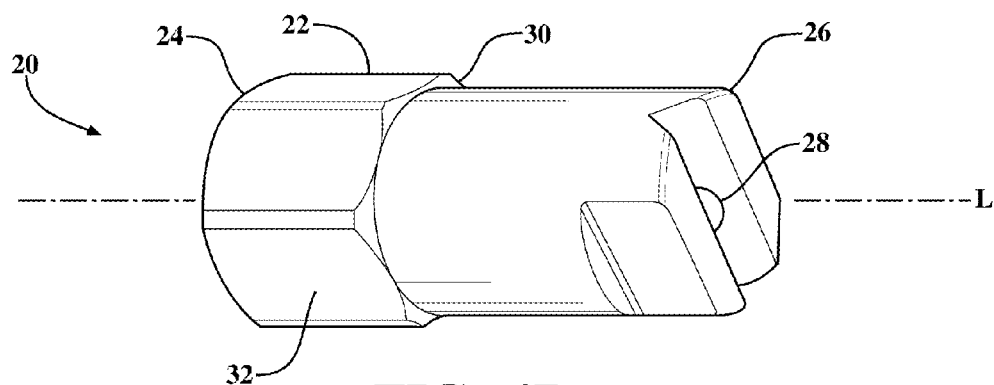
Figure 5:
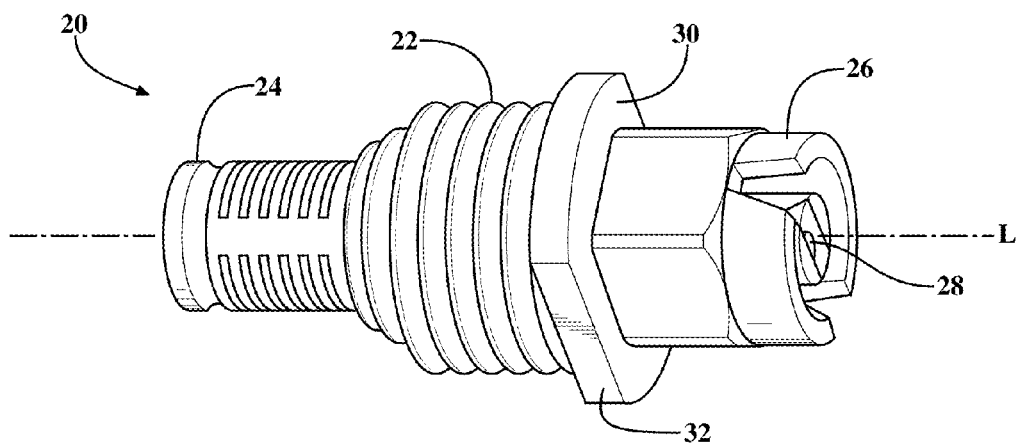
FIG. 5 is a perspective view of a fifth embodiment of the spray nozzle of this disclosure that produces a flat spray pattern.

A method for minimizing emissions of a polyisocyanate while spraying a mixture of the polyisocyanate and a resin composition onto a surface (S) to form a polyurethane foam thereon is described herein. The terminology "emissions" refers to an amount or concentration of the polyisocyanate present in air as produced from spraying the mixture. Typically, the emissions are measured after approximately 20, 19, 18, 17, 16, 15, 14, 13, 12, 11, 10, 9, 8, 7, 6, 5, 4, 3, 2, or 1, minutes of continuous spraying of the mixture. However, the measurement of the emissions need not be limited to this time and may occur at any time after spraying. It is also to be understood that the measurement of the emissions may occur at ground level, below grade, or at a heightened position such as when on a scaffold or ladder. Alternatively, the emissions are measured at 1, 2, 3, 4, 5, 6, 7, 8, 9, 10, 11, 12, 13, 14, 15, 16, 17, 18, 19, or 20, feet from the ground.

Spraying the mixture onto the surface (S) produces less than 50, and alternatively less then 45, 40, 35, 30, 35, 20, 15, 10, 9, 8, 7, 6, 5, 4, 3, 2, or 1, parts of the polyisocyanate per one billion parts of air (ppb) within a semicircle emanating from the surface (S) according to the NIOSH 5521 Impingement Method. The semicircle may have any radius, e.g. 1, 2, 3, 4, 5, 6, 7, 8, 9, 10, 11, 12, 13, 14, 15, 16, 17, 18, 19, 20, 25, 30, 35, 40, 45, or 50, feet. In one embodiment, the semicircle has a radius (r) of 3 feet measured from the surface (S), as shown in FIG. 11. In another embodiment, the measurement of emissions occurs within a semicircle emanating from the surface (S) and having a radius (r) of 15 feet measured from the surface (S). In this embodiment, spraying the mixture of the polyisocyanate and the resin composition onto the surface (S) typically produces less than 25, more typically less than 15, still more typically less than 10, even more typically less than 5, still more typically less than 3, and most typically of less than 1.2, parts of the polyisocyanate per one billion parts of air (ppb) according to the NIOSH 5521 Impingement Method. In still another embodiment, the measurement of emissions occurs within a semicircle emanating from the surface (S) and having a radius (r) of 18 inches measured from the head of a technician spraying the mixture approximately 10 feet from the surface (S). In this embodiment, spraying the mixture of the polyisocyanate and the resin composition onto the surface (S) typically produces less than 25, more typically less than 15, still more typically less than 10, even more typically less than 5, still more typically less than 3, and most typically of less than 2, parts of the polyisocyanate per one billion parts of air (ppb) according to the NIOSH 5521 Impingement Method. In all of these embodiments, the emissions are typically measured according to the NIOSH 5521 Impingement Method, which is well understood in the art. It is to be understood that emissions of other components of the resin composition or other components used to form the polyurethane may also be reduced. For example, if a monomeric isocyanate is also utilized, the emissions of the monomeric isocyanate may also be reduced. The emissions of the other components may be reduced in the same or different amounts as that of the polyisocyanate including those described above and below.

The surface (S) upon which the mixture is sprayed may be any surface but is typically a surface of a residential or commercial structure or building, such as a single or multiple family home, a modular home, or a business, that typically has at least three walls, a floor, and a roof. Most typically, the surface (S) is a wall, floor, or ceiling of the building. In one embodiment, the surface (S) is a wall of a building and the mixture is sprayed on the wall of the building on-site, i.e., at a construction location. In another embodiment, the surface (S) is a wall of a building but the mixture is sprayed onto the wall before the wall is installed in the building, i.e., off-site of the construction location. The surface (S) upon which the mixture is sprayed may be, but is not limited to, brick, concrete, masonry, dry-wall, sheet-rock, plaster, metal, stone, wood, plastic, a polymer composite, or combinations thereof. It is also contemplated that the surface (S) upon which the mixture is sprayed may be a surface of a vehicle or machine component.

The method includes the steps of providing the polyisocyanate and providing the resin composition. In other words, both the polyisocyanate and the resin composition are supplied for use in the method. Typically, the polyisocyanate and the resin composition are formulated off-site and then delivered to an area where they are used. In one embodiment, the method includes the step of heating the polyisocyanate and the resin composition to a temperature of from 70° F. to 95° F. and more preferably to a temperature of from 80° F. to 85° F. In another embodiment, the method includes the step of heating the polyisocyanate and the resin composition to a temperature of about 80° F. Without intending to be bound by any particular theory, it is believed that this temperature promotes ease of flow of the polyisocyanate and the resin composition in a polyurethane spraying system described in greater detail below.

As first introduced above, the polyisocyanate and the resin composition react to form a polyurethane foam on the surface (S). The polyurethane foam may be rigid (i.e., have a ratio of compressive strength to tensile strength of 0.5:1 or greater and an elongation of 10 percent or less) and may have a closed cell content of at least 90 percent. In an alternative embodiment, the polyurethane foam has a closed cell content of at least 95 percent. However, it is also contemplated that the polyurethane foam may be flexible and/or may be further defined as an open cell foam. The polyurethane foam may be used for any purposed including, but not limited to, insulation, sound-proofing, vibration dampening, and combinations thereof. Most typically, the polyurethane foam is used as insulation. In one embodiment, the polyurethane foam is used as a structural reinforcement in modular homes to reduce dry-wall cracking during transport of the modular homes to a home site. The polyurethane foam may stiffen surfaces such as the walls of the modular homes to minimize sway and torque during transport.

The polyisocyanate of this disclosure may be a single isocyanate or may include a mixture of isocyanates. Typically, the polyisocyanate is selected from, but is not limited to, the group of aliphatic isocyanates, cycloaliphatic isocyanates, araliphatic isocyanates, aromatic multivalent isocyanates, and combinations thereof. Particularly suitable non-limiting examples of the polyisocyanate include alkylene diisocyanates having 4 to 12 carbons in an alkylene radical such as 1,12-dodecane diisocyanate, 2-ethyl-1,4-tetramethylene diisocyanate, 2-methyl-1,5-pentamethylene diisocyanate, 1,4-tetramethylene diisocyanate and 1,6-hexamethylene diisocyanate, cycloaliphatic diisocyanates such as 1,3- and 1,4-cyclohexane diisocyanate, 1-isocyanato-3,3,5-trimethyl-5-isocyanatomethylcyclohexane (isophorone diisocyanate), 2,4- and 2,6-hexahydrotoluene diisocyanate, 2,4'-dicyclohexylmethane diisocyanate, mixtures of 4,4'- and 2,4'-diphenylmethane diisocyanates and polyphenylenepolymethylene polyisocyanates (polymeric MDI), m-phenylene diisocyanate, 2,4-toluene diisocyanate, 2,6-toluene diisocyanate, hexamethylene diisocyanate, tetramethylene diisocyanate, cyclohexane-1,4-diisocyanate, hexahydrotoluene diisocyanate, naphthalene-1,5-diisocyanate, 1-methoxyphenyl-2,4-diisocyanate, 4,4'-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate and 3,3'-dimethyldiphenylmethant-4,4'-diisocyanate, 4,4',4''-triphenylmethane triisocyanate, toluene 2,4,6-triisocyanate; 4,4'-dimethyldiphenylmethane-2,2',5,5'-tetraisocyanate, polymethylene polyphenylene polyisocyanate, isomers thereof, and combinations thereof. In one embodiment, the polyisocyanate is further defined as methylene diphenyl diisocyanate (MDI).

In an alternative embodiment, the polyisocyanate is further defined as a modified multivalent isocyanate. As is known in the art, modified multivalent isocyanates are typically formed through partial chemical reactions of organic diisocyanates and/or polyisocyanates. Particularly suitable non-limiting examples of modified multivalent isocyanates include diisocyanates and/or polyisocyanates having ester groups, urea groups, biuret groups, allophanate groups, carbodiimide groups, isocyanurate groups, and/or urethane groups. The polyisocyanate may include, but is not limited to, one or more urethane groups and typically has an NCO content of from 15 to 33.6 or from 21 to 32, weight percent, based on a total weight of the polyisocyanate. Of course, it is to be understood that the polyisocyanate is not limited to such an NCO content. The urethane groups of the polyisocyanate may be formed through reaction of a base polyisocyanate, as described above, with low molecular weight diols, triols, dialkylene glycols, trialkylene glycols, polyoxyalkylene glycols with a number average molecular weight of up to 1500 g/mol, diethylene glycol, dipropylene glycol, polyoxyethylene glycol, polyoxypropylene glycol, polyoxyethylene glycol, polyoxypropylene glycol, and/or polyoxypropylene polyoxyethylene glycols or -triols, and combinations thereof. The polyisocyanate may also include one or more prepolymers including isocyanate groups that typically have an NCO content of 9 to 25 and more typically of from 14 to 21, weight percent based on a total weight of the prepolymer. Alternatively, the polyisocyanate may be further defined as a liquid polyisocyanate including one or more carbodiimide groups having an NCO content of from 15 to 33.6 or from 21 to 32, weight percent based on a total weight of the polyisocyanate. Crude polyisocyanates may also be used in the compositions of the present disclosure, such as crude toluene diisocyanate obtained by the phosgenation of a mixture of toluenediamines or crude diphenylmethane isocyanate obtained by the phosgenation of crude isocyanates as disclosed in U.S. Pat. No. 3,215,652, the disclosure of which is directed at phosgenation is expressly incorporated herein by reference. In one embodiment, the polyisocyanate may be any of those described in U.S. Pat. No. 6,534,556, which is hereby expressly incorporated by reference relative to the polyisocyanates.

Referring now to the resin composition, the resin composition has a hydroxyl content of at least 400 mg KOH/g. In one embodiment, the resin composition has a hydroxyl content of from 400 to 550 mg KOH/g. The resin composition also typically has a viscosity of less than 500 centipoises, and more typically of from 400 to 500 centipoises, measured at 25° C. using a Brookfield Viscometer. Alternatively, the resin composition may be as described in U.S. Pat. No. 6,534,556, which is hereby expressly incorporated by reference relative to the resin composition.

The resin composition includes a (i) blowing agent that is a liquid under a pressure greater than atmospheric pressure. In one embodiment, the (i) blowing agent is selected from the group consisting of volatile non-halogenated $C_2$ to $C_7$ hydrocarbons, hydrofluorocarbons, and mixtures thereof. In another embodiment, the (i) blowing agent is a physically active blowing agent, such as a $C_1$-$C_4$ hydrofluorocarbon having a boiling point of 26° C. or less. As is known in the art, physically active blowing agents typically boil at an exotherm foaming temperature or less, most typically at 50°

C. or less. Examples of particularly suitable physically active blowing agents include, but are not limited to, volatile non-halogenated hydrocarbons having two to seven carbon atoms such as alkanes, alkenes, cycloalkanes having up to 6 carbon atoms, dialkyl ether, cycloalkylene ethers and ketones, and hydrofluorocarbons (HFCs).

The (i) blowing agent may have a zero ozone depletion potential. In other embodiments, the (i) blowing agent has an ozone depletion potential of less than 1.1, less than 1, less than 0.8, less than 0.6, less than 0.1, or from 0.01 to 0.1. As is known in the art, the terminology "ozone depletion potential" is defined as a ratio of an impact on ozone of a first chemical compared to an impact on ozone of a similar mass of trichlorofluoromethane (R-11/CFC-11). In other words, ozone depletion potential is a ratio of global loss of ozone due to a given chemical to a global loss of ozone due to CFC-11 of the same mass.

In still other embodiments, the (i) blowing agent is further defined as, but is not limited to, a volatile non-halogenated hydrocarbon such as a linear or a branched alkane such as butane, isobutane, 2,3-dimethylbutane, n- and isopentanes, n- and isohexanes, n- and isoheptanes, n- and isooctanes, n- and isononanes, n- and isodecanes, n- and isoundecanes, and n- and isodedecanes, alkenes such as 1-pentene, 2-methylbutene, 3-methylbutene, and 1-hexene, cycloalkanes such as cyclobutane, cyclopentane, and cyclohexane, linear and/or cyclic ethers such as dimethyl ether, diethyl ether, methyl ethyl ether, vinyl methyl ether, vinyl ethyl ether, divinyl ether, tetrahydrofuran and furan, ketones such as acetone, methyl ethyl ketone and cyclopentanone, isomers thereof, and combinations thereof.

In another embodiment, the (i) blowing agent is further defined as a hydrofluorocarbon such as difluoromethane (HFC-32), 1,1,1,2-tetrafluoroethane (HFC-134a), 1,1,2,2-tetrafluoroethane (HFC-134), 1,1-difluoroethane (HFC-152a), 1,2-difluoroethane (HFC-142), trifluoromethane, heptafluoropropane (R-227a), hexafluoropropane (R-136), 1,1,1-trifluoroethane, 1,1,2-trifluoroethane, fluoroethane (R-161), 1,1,1,2,2-pentafluoropropane, pentafluoropropylene (R-2125a), 1,1,1,3-tetrafluoropropane, tetrafluoropropylene (R-2134a), difluoropropylene (R-2152b), 1,1,2,3,3-pentafluoropropane, 1,1,1,3,3-pentafluoro-n-butane, and 1,1,1,3,3-pentafluoropentane (245fa), isomers thereof, and combinations thereof. In an alternative embodiment, the (i) blowing agent is further defined as 1,1,1,2-tetrafluoroethane (HFC-134a), also known as R-134a. HFC-134a has a boiling point of 247 K (−26° C. at 760 mm/Hg) and readily vaporizes at atmospheric pressure. Alternatively, the (i) blowing agent may be as described in U.S. Pat. No. 6,534,556, which is hereby expressly incorporated by reference relative to the blowing agents. Typically, the (i) blowing agent is present in an amount of from 2 to 20, more typically in an amount of from 5 to 15, and most typically in an amount of from 7 to 10 parts by weight per 100 parts by weight of the resin composition. However, the amount of the (i) blowing agent used typically depends on a desired density of the polyurethane foam and solubility of the (i) blowing agent in the resin composition. It is desirable to minimize amounts of the (i) blowing agent used to reduce costs.

In addition to the (i) blowing agent, the resin composition also includes a (ii) first polyol. The first polyol is selected from the group of a Mannich polyol, an autocatalytic polyol, and combinations thereof. As is known in the art, autocatalytic polyols typically include one or more tertiary nitrogen groups (e.g. amine groups) and typically require less capping with primary hydroxyl groups to achieve suitable performance. Suitable non-limiting examples of the autocatalytic polyol include Pluracol® SG 360, Pluracol® P824, Pluracol® P736, Pluracol® P922, Pluracol® P1016, and combinations thereof. Each of these autocatalytic polyols are commercially available from BASF Corporation. Of course, the autocatalytic polyol is not limited to those described above and may be any known in the art. In one embodiment, the autocatalytic polyol is as defined in U.S. Pat. No. 6,924,321, which is expressly incorporated herein by reference relative to this embodiment. In one embodiment, no other catalyst is used in conjunction with the autocatalytic polyol. However, one or more catalysts may be used as selected by one of skill in the art.

The Mannich polyol may be any known in the art but typically has a viscosity of at least 4,000 centipoise at 25° C. The Mannich polyol is typically formed by alkoxylating a Mannich compound (e.g. a condensation product of phenol or a substituted phenol (e.g. nonylphenol), formaldehyde, and an alkanolamine, such as diethanolamine). As is known in the art, this alkoxylation may include premixing the phenol with the diethanolamine and then adding formaldehyde at a temperature below a temperature of Novolac formation. Typically, after the formaldehyde reacts, water is stripped to provide a crude Mannich reaction product. The Mannich reaction product then may be alkoxylated with an alkylene oxide such as propylene oxide, ethylene oxide, or combinations thereof. The alkylene oxide typically includes from 80 wt. % to about 100 wt. % propylene oxide and less than about 20 wt. % ethylene oxide. Alkoxylation of Mannich reaction products is described in U.S. Pat. Nos. 3,297,597 and 4,137,265, the disclosures of which are herein expressly incorporated by reference. In one embodiment, the Mannich polyol is as defined in U.S. Pat. No. 6,495,722, which is expressly incorporated herein by reference relative to this embodiment. Typically, Mannich polyols have at least one nitrogen containing moiety (e.g. —N(CH$_2$)$_4$(OH)$_2$) singly bonded to a CH$_2$ moiety.

More specifically, alkoxylation of the Mannich reaction product is typically carried out by introducing the propylene oxide to the Mannich reaction product under pressure. No added catalyst is typically needed since basic nitrogen atoms in the reaction product provide sufficient catalytic alkoxylation. Typically, alkoxylation proceeds at temperatures of from 30° C. to 200° C. and more typically at temperatures of from 90° C. to 120° C. At these temperatures, phenolic hydroxyl groups and alkanolamino hydroxyl groups react to form hydroxypropyl groups. Any unreacted or partially reacted compounds are typically removed from the (ii) first polyol. In one embodiment, the Mannich polyol is as described in U.S. Pat. No. 6,534,556, which is hereby expressly incorporated by reference relative to the Mannich polyols. In another embodiment, the Mannich polyol includes an aromatic, amino polyol having an amino content of at least 2.8 meq/g. Typically, the Mannich polyol is present in an amount of from 10 to 60, more typically in an amount of from 20 to 50, and most typically in an amount of from 20 to 40 parts by weight per 100 parts by weight of the resin composition.

In addition, the resin composition includes (iii) at least one additional polyol other than the (ii) first polyol. The (iii) additional polyol may be any known in the art and has at least two isocyanate-reactive hydrogen atoms. The (iii) additional polyol typically has an average hydroxyl number of from 150 to 800 mg KOH/g, but is not limited to such a value. Suitable non-limiting examples of the (iii) additional polyol include polythioether polyols, polyester amides and polyacetals containing hydroxyl groups, aliphatic polycarbonates including hydroxyl groups, amine-terminated polyoxyalkylene polyethers, polyester polyols, polyoxyalkylene polyether polyols, and combinations thereof.

The polyester polyols may include up to about 40 weight percent free glycol and may be further defined as ε-caprolactone or as a hydroxycarboxylic acids, e.g. ω-hydroxycaproic acid. The polyester polyol may be formed from organic dicarboxylic acids having 2 to 12 carbon atoms, aliphatic dicarboxylic acids having 4 to 6 carbon atoms, or multivalent alcohols, such as diols, having 2 to 12 carbon atoms and most preferably 2 to 6 carbon atoms. Suitable non-limiting examples of dicarboxylic acids include succinic acid, glutaric acid, adipic acid, suberic acid, azelaic acid, sebacic acid, decanedicarboxylic acid, maleic acid, fumaric acid, phthalic acid, isophthalic acid, terephthalic acid, and combinations thereof. Alternatively, dicarboxylic acid derivatives may also be used and may include, for example, dicarboxylic acid mono- or di-esters of alcohols having 1 to 4 carbon atoms, or dicarboxylic acid anhydrides. Dicarboxylic acid mixtures of succinic acid, glutaric acid and adipic acid in weight ratios of 20-35:35-50:20-32 parts by weight are preferred. Typical examples of divalent and multivalent alcohols that may be used to form the polyester polyol include ethanediol, diethylene glycol, 1,2- and 1,3-propanediol, dipropylene glycol, 1,4-butanediol, 1,5-pentanediol, 1,6-hexanediol, 1,10-decanediol, glycerine and trimethylolpropanes, tripropylene glycol, tetraethylene glycol, tetrapropylene glycol, tetramethylene glycol, 1,4-cyclohexane-dimethanol, ethanediol, diethylene glycol, 1,4-butanediol, 1,5-pentanediol, 1,6-hexanediol, and combinations thereof.

The polyester polyol can be formed by polycondensation/esterification of organic polycarboxylic acids, e.g. aromatic or aliphatic polycarboxylic acids and/or derivatives thereof, and multivalent alcohols in the absence of catalysts or in an inert atmosphere such as nitrogen, carbon dioxide, or a noble gas. Typically, the polyester polyol is formed at temperatures of from 150° C. to 250° C. and more typically at temperatures of from 180° C. to 220° C. The reaction can be carried out as a batch process or as a continuous process and may include a catalyst including iron, cadmium, cobalt, lead, zinc, antimony, magnesium, titanium and/or tin. To produce the polyester polyols, the organic polycarboxylic acids and multivalent alcohols are preferably condensed in a mole ratio of 1:1-1.8 and more preferably in a mole ratio of 1:1.05-1.2.

Alternatively, aromatic polyester polyols can be formed using ester by-products from the manufacture of dimethyl terephthalate, polyalkylene terephthalates, phthalic anhydride, residues from the manufacture of phthalic acid or phthalic anhydride, terephthalic acid, residues from the manufacture of terephthalic acid, isophthalic acid, trimellitic anhydride, and combinations thereof.

Polyether polyols can be formed by anionic polymerization with alkali hydroxides such as sodium hydroxide or potassium hydroxide or alkali alcoholates, such as sodium methylate, sodium ethylate, or potassium ethylate or potassium isopropylate as catalysts and with the addition of at least one initiator molecule preferably including from 2 to 8 and more preferably from 3 to 8, reactive hydrogen atoms. Alternatively, cationic polymerization with Lewis acids such as antimony pentachloride and boron trifluoride etherate can be used. The polyether polyols may be prepared from any initiators known in the art including, but not limited to, ethylene glycol, propylene glycol, dipropylene glycol, trimethylene glycol, 1,2-butanediol, 1,5-pentanediol, 1,6-hexanediol, 1,7-heptanediol, hydroquinone, resorcinol glycerol, glycerine, 1,1,1-trimethylol-propane, 1,1,1-trimethylolethane, pentaerythritol, 1,2,6-hexanetriol, a-methyl glucoside, sucrose, sorbitol, 2,2-bis(4-hydroxyphenyl)-propane, tetrahydrofuran and alkylene oxide-tetrahydrofuran mixtures, epihalohydrins such as epichlorohydrin, and combinations thereof. These initiators can react with any suitable alkylene oxide such as 1,3-propylene oxide, 1,2- and 2,3-butylene oxide, amylene oxides, styrene oxide, ethylene oxide, 1,2-propylene oxide, and combinations thereof.

Suitable non-limiting examples of polyether polyols that may be included in the resin composition include polyoxyethylene glycol, polyoxypropylene glycol, polyoxybutylene glycol, polytetramethylene glycol, block copolymers, polyoxypropylene glycol, polyoxyethylene glycol, poly-1,2-oxybutylene glycol, polyoxyethylene glycol, poly-1,4-tetramethylene glycol, polyoxyethylene glycol, copolymer glycols prepared from blends or sequential addition of two or more alkylene oxides, and combinations thereof. Particularly preferred polyether polyols include, but are not limited to, Voranol® 370 polyol, a sucrose based polyether polyol having a hydroxyl number of approximately 370 and commercially available from Dow Chemical, Pluracol® 450 and 550 polyether tetrols having hydroxyl numbers of approximately 560 and 450, respectively and commercially available from BASF Corporation, LHT-240 a polyether triol having a hydroxyl number of approximately 270 and commercially available from AC West Virginia Polyol Company.

In one embodiment, the (iii) additional polyol is formed from condensation of an amine initiator and an alkylene oxide. Suitable amine initiators include, but are not limited to, aniline, N-alkylphenylenediamines, 2,4'-2,2', and 4,4'-methylenedianiline, 2,6- or 2,4-toluenediamine, vicinal toluenediamines, o-chloro-aniline, p-aminoaniline, 1,5-diaminonaphthalene, methylene dianiline, condensation products of aniline and formaldehyde, isomeric diaminotoluenes, aliphatic amines such as mono-, di-, and trialkanolamines, ethylene diamine, propylene diamine, diethylenetriamine, methylamine, ethanolamine, diethanolamine, N-methyl- and N-ethylethanolamine, N-methyl- and N-ethyldiethanolamine, triethanolamine, triisopropanolamine, 1,3-diaminopropane, 1,3-diaminobutane, 1,4-diaminobutane, and combinations thereof. Alternatively, the (iii) additional polyol may be formed from condensation of a thiol initiator and an alkylene oxide. The thiol initiator may include, but is not limited to, a condensation product of thiodiglycol, a reaction product of a dicarboxylic acid and a thioether glycol, alkanethiols including at least two —SH groups such as 1,2-ethanedithiol, 1,2-propanedithiol, 1,2-propanedithiol, and 1,6-hexanedithiol, alkene thiols such as 2-butene-1,4-dithiol, alkyne thiols such as 3-hexyne-1,6-dithiol, and combinations thereof. Alternatively, the (iii) additional polyol may include polyester amide functionality. In one embodiment, a polyacetal is condensed with an alkylene oxide. Still further, the (iii) additional polyol may be any of the additional polyols described in U.S. Pat. No. 6,534,556, which is expressly incorporated herein by reference relative to these additional polyols. It is also to be understood that the (iii) additional polyol may be further defined as a single polyol or as two or more polyols that are combined together. In other words, more than one additional polyol may be included in the resin composition. In various embodiments, two, three, four, and five additional polyols are included in the resin composition.

The (iii) additional polyol is typically present in an amount of from 10 to 60, more typically in an amount of from 20 to 50, and most typically in an amount of from 20 to 40 parts by weight per 100 parts by weight of the resin composition. In one embodiment, the (iii) additional polyol is further defined as a sucrose-initiated polyether polyol that present in an amount of less than or equal to about 20 weight percent based on a total weight of the resin composition. In another embodiment, the (iii) additional polyol is further defined as a polyether tetrol that is present in an amount of less than or equal to about 20 weight percent based on a total weight of the resin composition. In a further embodiment, the (iii) additional polyol is further defined as a polyether triol that is present in an amount of less than or equal to about 30 weight percent based on a total weight of the resin composition.

The resin composition may also optionally include (iv) a catalyst. The (iv) catalyst may include one or more catalysts and typically includes a combination of catalysts. In one embodiment, the (iv) catalyst includes a polyurethane curing catalyst. Typically, the polyurethane curing catalysts accelerate a reaction of the polyisocyanate and the first polyol and/or the (iii) additional polyol. The polyurethane curing catalysts may also shorten tack time, promote green strength and minimize foam shrinkage. Suitable polyurethane curing catalysts include, but are not limited to, organometallic catalysts, such as organo-lead catalysts, tin, titanium, copper, mercury, cobalt, nickel, iron, vanadium, antimony and manganese catalysts, and combinations thereof. The polyurethane curing catalyst may be further defined as a mixture of lead octoate and lead naphthanate. In one embodiment, the (iv) catalyst is substantially free of lead and typically includes less than 0.1, more typically of less than 0.01, and most typically of less than 0.001 parts by weight of lead per 100 parts by weight of the (iv) catalyst. In another embodiment, the (iv) catalyst is free of lead. In one embodiment, the (iv) catalyst includes lead octanoate that present in an amount of from 0.3 to 0.9 weight percent based on a total weight of the resin composition. In a further embodiment, the (iv) catalyst is as described in U.S. Pat. No. 6,534,556, which is hereby expressly incorporated by reference relative to these catalysts.

Suitable polyurethane curing catalysts include, but are not limited to, tertiary amines such as triethylamine,3-methoxypropyldimethylamine, triethylenediamine, tributylamine, dimethylcyclohexylamine, dimethylbenzylamine, N-methyl-, N-ethyl- and N-cyclohexylmorpholine, N,N,N', N'-tetramethylethylenediamine, N,N,N',N'-tetramethylbutanediamine or -hexanediamine, N,N,N'-trimethyl isopropyl propylenediamine, pentamethyldiethylenetriamine, tetramethyldiaminoethylether, bis(-dimethylaminopropyl)urea, dimethylpiperazine, 1-methyl-4-dimethylaminoethylpiperazine, 1,2-dimethylimidazole, 1-azabicylo[3.3.0]octane and preferably 1,4-diazabicylo[2.2.2]octane, and alkanolamine compounds, such as triethanolamine, triisopropanolamine, N-methyl- and N-ethyldiethanolamine dimethylethanolamine, and combinations thereof.

Apart from polyurethane curing catalysts, the (iv) catalyst may also include a blowing catalyst that promotes a reaction of the (i) blowing agent. The blowing catalyst may include tertiary amine ethers such as N,N,N,N"-tetramethyl-2,2'-diaminodiethyl ether, 2-dimethylaminoethyl-1,3-dimethylamineopropyl ether, N,N-dimorpholinoethyl ether, and combinations thereof. The blowing catalyst can be used neat or dissolved in a carrier such as a glycol. In various embodiments, the blowing catalyst is further defined as pentamethyldiethylenetriamine and/or polyoxypropylenediamine and is present in an amount of from 0.01 to 3.0 weight percent based on a total weight of the resin composition.

The (iv) catalyst may further include a gelation catalyst that promotes gelling of the resin composition as opposed to foaming. The gelation catalyst typically includes an amine catalyst such as triethylenediamine in a dipropylene glycol carrier. This type of catalyst is commercially available from Air Products Corp. under the trade name DABCO® LV-33. In one embodiment, the gelation catalyst is present in an amount of from 0.01 to 3.0 weight percent based on a total weight of the resin composition.

In addition to the (iv) catalyst, the resin composition may also optionally include a (v) surfactant. The (v) surfactant typically supports homogenization of the (i) blowing agent, (ii) first polyol and (iii) additional polyol and regulates a cell structure of the polyurethane foam. Non-limiting examples of suitable (v) surfactants include salts of sulfonic acids, e.g. alkali metal and/or ammonium salts of oleic acid, stearic acid, dodecylbenzene- or dinaphthylmethane-disulfonic acid, and ricinoleic acid, foam stabilizers such as siloxane-oxyalkylene copolymers and other organopolysiloxanes, oxyethylated alkyl-phenols, oxyethylated fatty alcohols, paraffin oils, castor oil esters, ricinoleic acid esters, Turkey red oil and groundnut oil, and cell regulators, such as paraffins, fatty alcohols, and dimethylpolysiloxanes. In one embodiment, the (v) surfactant is a non-silicone surfactant. In other words, in this embodiment, the (v) surfactant is free of silicone. A particularly suitable non-silicone surfactant is LK-443 commercially available from Air Products Corporation. The (v) surfactant may be included in the resin composition in an amount of from 0.001 to 5 weight percent. However, these amounts are not intended to limit this disclosure.

The resin composition may also optionally include (vi) water. The water may be of any purity including tap, well, de-ionized, distilled, and the like. Typically, the water is present in a minimized amount. For example, in various embodiments where water is used, the water is present in amounts of from 0.1 to 10, more typically of from 0.1 to 5, and most typically of from 1 to 3, parts by weight of water per 100 parts by weight of the composition. The water may be included as described in U.S. Pat. No. 6,534,556, which is hereby expressly incorporated by reference relative to the water. In one embodiment, the water is used as a blowing agent.

Further, the resin composition may optionally include an (vii) additive or a plurality of additives. The additive may be selected from the group of chain extenders, anti-foaming agents, processing additives, chain terminators, solvents, surface-active agents, adhesion promoters, flame retardants, anti-oxidants, dyes, ultraviolet light stabilizers, fillers, thixotropic agents, stabilizers, fungicides, pigments, dyes, bacteriostats, and combinations thereof. In various embodiments, the (vi) additive is a flame retardant or a mixture of flame retardants. Examples of suitable flame retardants include, but are not limited to, tricresyl phosphate, tris(2-chloroethyl) phosphate, tris(2-chloropropyl)phosphate, tris(2,3-dibromopropyl)phosphate, red phosphorus, aluminum oxide hydrate, antimony trioxide, arsenic oxide, ammonium polyphosphate (Exolit®) and calcium sulfate, molybdenum trioxide, ammonium molybdate, ammonium phosphate, pentabromodiphenyloxide, 2,3-dibromopropanol, hexabromocyclododecane, dibromoethyldibromocyclohexane, expandable graphite or cyanuric acid derivatives, melamine, corn starch, and combinations thereof. The resin composition typically includes from 2 to 40, and more typically from 5 to 20, parts by weight of the additive per 100 parts by weight of the resin composition. The additive may be as described in U.S. Pat. No. 6,534,556, which is hereby expressly incorporated by reference relative to the additive.

In one embodiment, the chemistry of the reaction between an isocyanate (typically MDI) and a resin (comprising a polyol, e.g. 50 to 60 wt % for closed cell foams or 30 to 50 wt % for open cell foams) influences one or more parameters of the system and/or method of this disclosure. For example, to form a closed cell foam, a blowing agent is typically used to obtain a desired density that may be from about 1.9 to about 2.5 pound per cubic feet. The blowing agent may volatilize into a gas due to the heat of the reaction. For some closed cell foams, the dominant reaction is typically between the isocyanate and polyol. There may also be another reaction between water molecules and isocyanate. To form an open cell foam, the reactions tend to be more balanced. A reaction between water and an isocyanate may be more prevalent in the formation of open cell foams than in closed cell foams. These reactions may occur at a one to one by volume ratio between the isocyanate and the polyol. In one embodiment, a typical resin used to form closed cell foams includes one or more polyester polyols and one or more polyether polyols.

In various embodiments, one or more of the following components may be utilized to form, for example, open and/or closed cell foams for insulation, roofing, etc:

| Component | Non-Limiting Examples of the Component | Approximate Weight Percentages |
|---|---|---|
| Polyester polyol | Polyethylene terephthalate, diethylene glycol (DEG), phthalic acid, and/or terephthalic acid | 35-45 |
| Polyether polyol | Phenol or nonylphenol, formaldehyde, and/or amines, one or more with propylene oxide and optionally ethylene oxide | 10-25 |
| Polyether polyol | Sucrose, glycerin, propylene glycol, and/or propylene oxide | 8-10 |
| Fire retardant | Tetrabromo phthalic anhydride diol | 5-10 |
| Fire retardant | tris-(chloroisopropyl) phosphate and/or triethylphosphate | 5-10 |
| Catalysts | Combinations of tertiary amines of varying chemical structure: dimethylethanolamine (DMEA); triethylenediamine (TEDA); pentamethyldiethylenetriamine; and/or 2-{{2-(Dimethylamino)ethyl}methylamino}-ethanol | 3-7 |
| Catalysts | Bismuth carboxylic acids, e.g. Bi-octoate, Bi-neodecanoate, and/or Bi-ethylhexanoate be diluted with mineral spirits or straight acid, and/or potassium salts | 1-2 |
| Surfactant | DABCO DC193 | 1 |
| Blowing agent | 1,1,1,1,1-pentafluoropropane | 8-10 |
| Blowing agent | Water | 1.7-1.9 |
| | Total | 100 |
| Polyether polyol | High molecular weight, primary hydroxyl terminated triol with typical functionality of about 3 | 10-25 |
| Polyether polyol | Sucrose, glycerin, propylene glycol, and/or propylene oxide | 10-25 |
| Crosslinker | Glycerin and/or diethylene glycol (DEG) | 0-3 |
| Fire retardant | Tetrabromo phthalic anhydride diol | 5-10 |
| Fire retardant | tris-(chloroisopropyl) phosphate and/or triethylphosphate | 5-20 |
| Catalysts | Combinations of tertiary amines of varying chemical structure: dimethylethanolamine (DMEA); triethylenediamine (TEDA); pentamethyldiethylenetriamine; and/or 2-{{2-(Dimethylamino)ethyl}methylamino}-ethanol | 3-7 |
| Surfactant | DABCO DC193 | 1-4 |
| Blowing agent | Water | 12-30 |
| | Total | 100 |
| Polyester polyol | Polyethylene terephthalate, diethylene glycol (DEG), phthalic acid and/or terephthalic acid | |
| Polyether polyol | Phenol or nonylphenol, formaldehyde, and/or amines, one or more with propylene oxide and optionally ethylene oxide | |
| Polyether polyol | Sucrose, glycerine, propylene glycol, and/or propylene oxide | |
| Crosslinker | Glycerin and/or diethylene glycol (DEG) | |
| Fire retardant | Tetrabromo phthalic anhydride diol | |
| Fire retardant | tris-(chloroisopropyl) phosphate and/or triethylphosphate | |
| Catalysts | Combinations of tertiary amines of varying chemical structure: dimethylethanolamine (DMEA); triethylenediamine (TEDA); pentamethyldiethylenetriamine; and/or 2-{{2-(Dimethylamino)ethyl}methylamino}-ethanol | |
| Catalysts | Bismuth carboxylic acids, e.g. Bi-octoate, Bi-neodecanoate, and/or Bi-ethylhexanoate be diluted with mineral spirits or straight acid, and/or potassium salts | |
| Surfactant | DABCO DC193 | |
| Surfactant | DABCO LK443 | |
| Blowing agent | 1,1,1,1,1-pentafluoropropane | |
| Blowing agent | Water | |

Referring back to the method, the method also includes the step of combining the resin composition with the polyisocyanate in the absence of other blowing agents to form the mixture. Typically, upon combination, the mixture is further defined as a "froth foaming mixture" because the (i) blowing agent spontaneously vaporizes when exposed to atmospheric pressure the polyisocyanate and the resin composition are combined and processed. In other words, the (i) blowing agent acts as a frothing agent to foam the mixture on a surface of a substrate upon which the mixture is applied.

The polyisocyanate and the resin composition may be combined by any means known in the art to form the mixture, e.g. in a proportioner. Typically, the step of combining occurs in a mixing apparatus such as a static mixer, impingement mixing chamber, or a mixing pump. In one embodiment, the step of mixing occurs in a static mixing tube. Alternatively, the polyisocyanate and the resin composition may be combined in a spray nozzle (20), so long as the mixture is sprayed according to this disclosure. The polyisocyanate and the resin composition are typically combined at an isocyanate index of from about 100 to 140, more typically from 100 to 130, even more typically from 110 to 120, and most typically from 110 to 115.

In one embodiment, the polyisocyanate and the resin composition are combined to form the mixture in the absence of blowing agents that are not the (i) blowing agent described above. In still another embodiment, the (i) blowing agent is added to the resin composition as the resin composition is combined with the polyisocyanate.

In another embodiment, the polyisocyanate and the resin composition are combined with a stream of air typically having a pressure of from 1 to 5, more typically of from 2 to 4, and most typically of about 3, psi. In this embodiment, the air is not functioning as a blowing agent and is instead functioning as a mixing agent. It is contemplated that the polyisocyanate may be combined with the stream of air before being combined with the resin composition. Alternatively, the resin composition may be combined with the stream of air before being combined with the polyisocyanate. Further, the polyisocyanate and the resin composition may be combined simultaneously with the stream of air. The stream of air is thought to aid in mixing and promote even spraying and distribution of the mixture, as described in greater detail below.

The method also includes the step of spraying the mixture onto the surface (S) to form the polyurethane foam thereon. Typically, the mixture is sprayed at a spray rate of from 1 to 30, from 5 to 25, from 5 to 20, from 5 to 10, from 5 to 15, from 15 to 20, from 20 to 25, from 25 to 30, from 6 to 17, or about 15, lbs/min. Also, the mixture is typically sprayed at a pressure of less than 250 psi and most typically at a pressure of from 230 to 240 psi. It is contemplated that the mixture may be sprayed at any rate or range of rates within the ranges set forth above. Similarly, it is contemplated that the mixture may be sprayed at any pressure or range of pressures within the ranges set forth above.

Figure 6A:
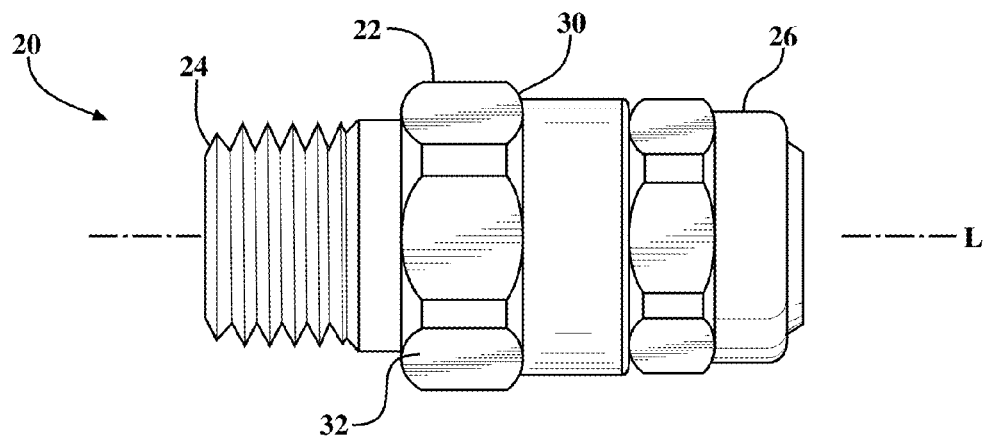
FIG. 6a is a side plan view of one embodiment of the spray nozzle of this disclosure that produces a conical spray pattern.
Figure 6B:
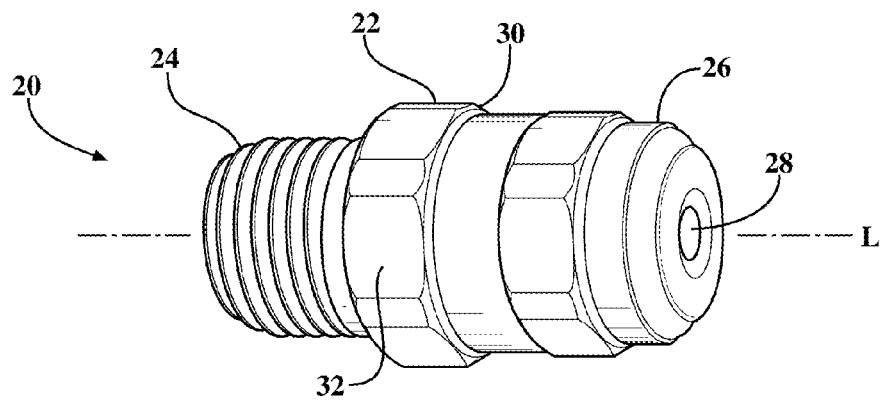
Figure 6C:
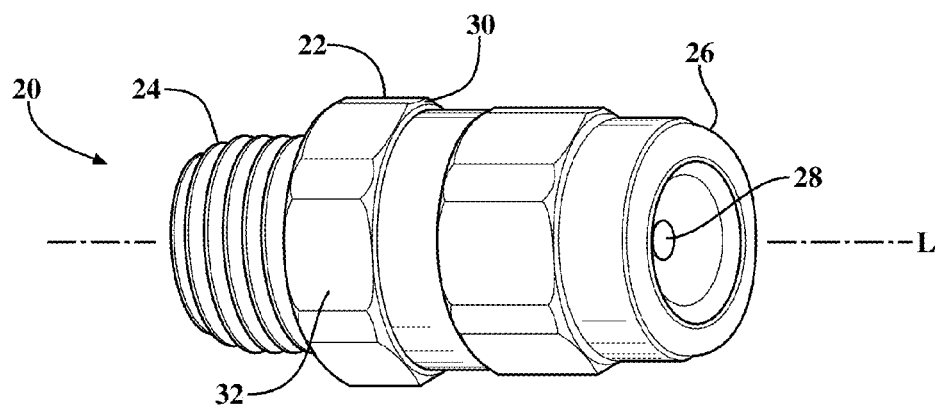
Figure 7A:
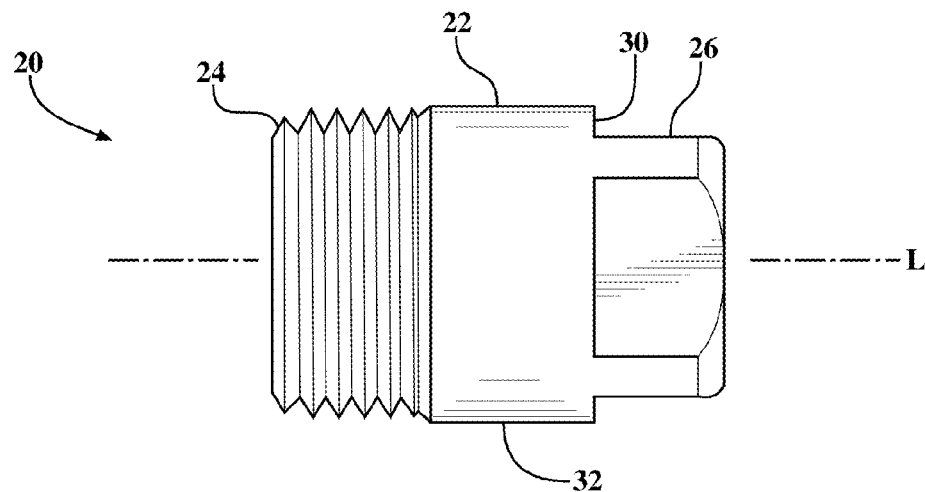
FIG. 7a is a side plan view of a second embodiment of the spray nozzle of this disclosure that produces a conical spray pattern.
Figure 7B:
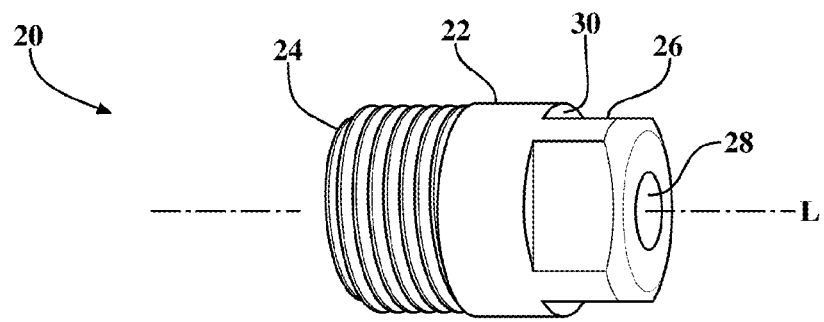
Figure 7C:
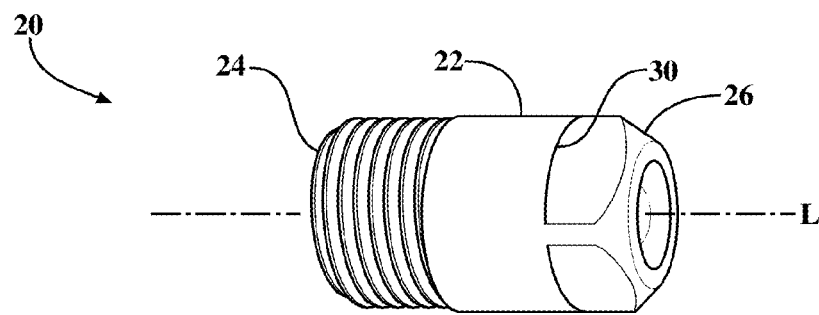

In the method, the mixture is sprayed with minimized emissions from the spray nozzle (20). The spray nozzle (20) through which the mixture is sprayed is typically a flat fan nozzle or a cone nozzle. The terminology "flat 'fan'" and "cone" are well known to those in the art of nozzle design. Useful spray nozzles (20) are commercially available from Spraying Systems Co. of Wheaton, Ill. under the trade names VeeJet®, WashJet®, FloodJet®, FlatJet®, FullJet®, and FoamJet®. Particularly useful spray nozzles (20) include the VeeJet® flat fan nozzles and WashJet® cone nozzles. FIGS. 1-5 illustrate particularly useful flat fan nozzles while FIGS. 6 and 7 illustrate particularly useful cone nozzles. Of course, the instant disclosure is not limited to use of these particular spray nozzles (20) and may utilize any flat fan or cone nozzles known in the art or any other type of nozzle so long as the mixture is sprayed according to this disclosure. The spray nozzle (20) may be formed from any material known in the art but is typically formed from brass, stainless steel, Kynar®, hardened stainless steel, and/or ceramic.

Figure 8A:
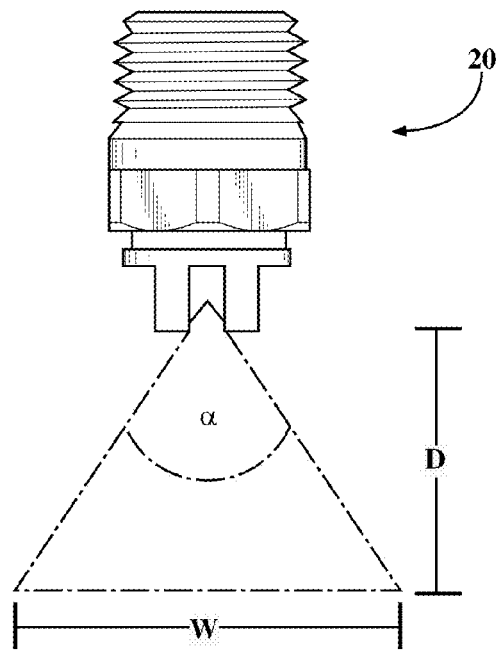
FIG. 8a is a side plan view of one embodiment of a flat fan spray nozzle of this disclosure and illustrates spray angle (α) and spray width (W) measured at a distance (D) from the spray nozzle.
Figure 8B:
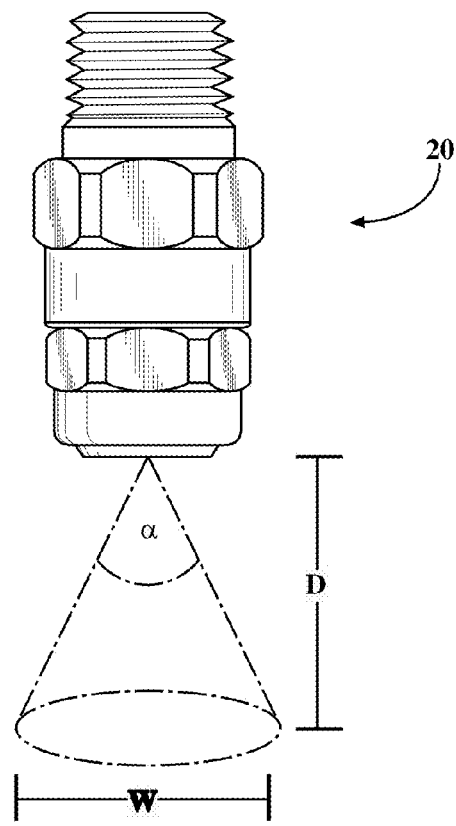
FIG. 8b is a side plan view of one embodiment of a conical spray nozzle of this disclosure and illustrates spray angle (α) and spray width (W) measured at a distance (D) from the spray nozzle.
Figure 12:
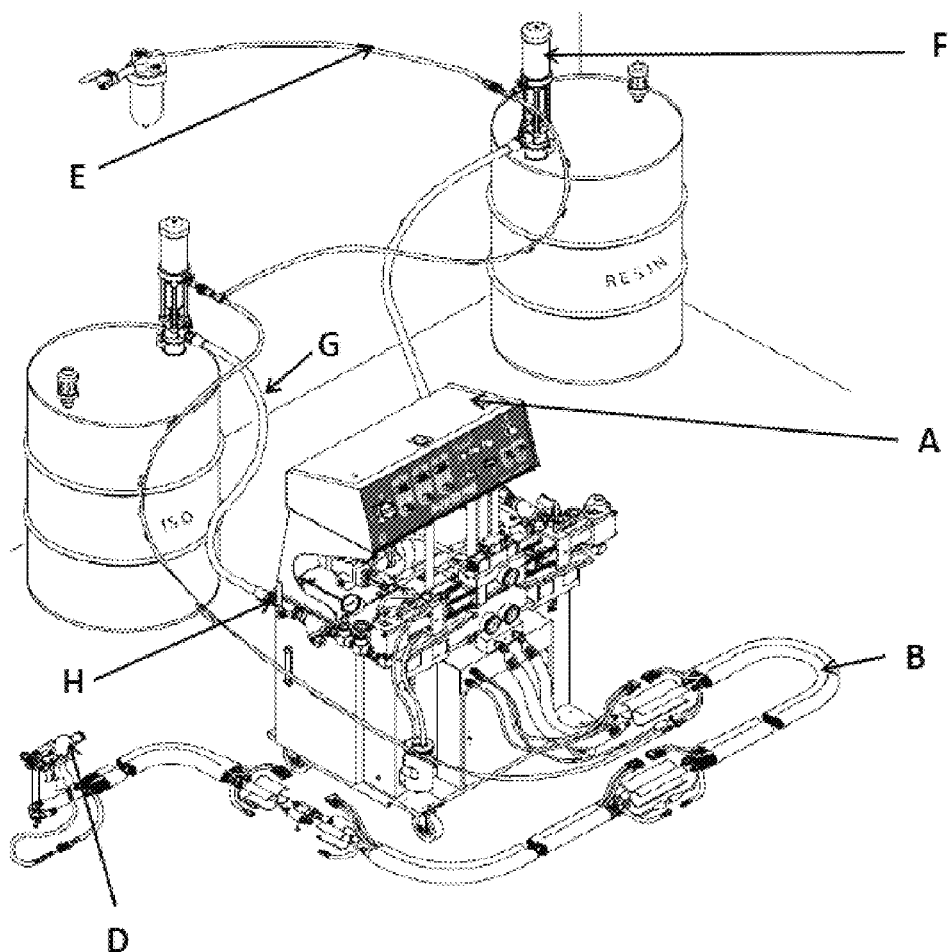
FIG. 12 is a schematic of one embodiment of the polyurethane spraying system of this disclosure.

The mixture is sprayed through the spray nozzle (20) at a spray angle ($\alpha$) that corresponds to a control spray angle of from 15 to 125 degrees measured at a pressure of from 10 to 40 psi using water as a standard, as illustrated in FIGS. 8 and 9. Said differently, the actual spray angles measured when spraying the instant mixture through the spray nozzle (20) may be different from the control spray angle ranges described herein due to the viscosity of the mixture as compared to the viscosity of the water standard. As just one example, the viscosity of the mixture may be greater than the viscosity of the water standard. As such, the actual spray angle that is emitted from the spray nozzle (20) when spraying the mixture may be different from the spray angle that would otherwise be produced if water was sprayed through the same spray nozzle (20). Accordingly, the control spray angle refers to a spray angle that is achieved when spraying water through the spray nozzle (20) at a pressure of from 10 to 40 psi.

In one embodiment, the spray angle ($\alpha$) is further defined as corresponding to a control spray angle of from 15 to 120 degrees when measured at a pressure of 40 psi using water as a standard. In this embodiment, the flat spray pattern typically has a spray width (W) that corresponds to a control spray width of from 2 to 30 inches measured at a distance (D) of about 10 inches from the spray nozzle (20), as shown in FIG. 8a, also using water as a standard. Said differently, the actual spray widths measured when spraying the instant mixture through the spray nozzle (20) may be different from the control spray width described herein due to the viscosity of the mixture as compared to the viscosity of the water standard. Just as above, the viscosity of the mixture may be greater than the viscosity of the water standard. As such, the actual spray width that is emitted from the spray nozzle (20) when spraying the mixture may be different from the spray width that would otherwise be produced if water was sprayed through the same spray nozzle (20). Accordingly, the control spray width refers to a spray width that is achieved when spraying water through the spray nozzle (20) measured at a distance (D) of about 10 inches from the spray nozzle (20).

The mixture may be sprayed in a flat spray pattern that is substantially planar. It is to be understood that the terminology "substantially planar" refers to a spray pattern that is planar, nearly planar and/or exhibiting characteristics associated with a planar element, without necessarily being restricted to this meaning. Typically, spray nozzles (20) distribute the mixture as a flat fan or sheet-type of spray. As is known in the art of nozzle design, there are several different types of flat spray nozzles (20) including axial and deflector configurations. Typically, narrower spray angles produce streams of the mixture at higher pressures at the surface (S). In one embodiment, the flat spray pattern has a tapered pattern, as is known and defined in the art. In another embodiment, the flat spray pattern has an even distribution, as is also known and defined in the art. Typically, the flat spray pattern that is substantially planar is of the type that is sprayed through a flat spray nozzle.

In other similar embodiments, the spray angle (α) corresponds to a control spray angle of 15, 25, 40, 50, 65, 80, 95, 110, or 120 degrees when measured at a pressure of 40 psi using water as a standard. The terminology "flat spray pattern" is well recognized to those of skill in the art and is approximately illustrated in FIG. 9*a*. It is contemplated that the mixture may be sprayed at any spray angle or within any range of spray angles within the ranges set forth above.

Alternatively, the spray angle (α) may be further defined as corresponding to a control spray angle of from equivalent to 15 to 125 degrees when measured at a pressure of 10 psi in a conical spray pattern using water as a standard. In one embodiment, the mixture is sprayed in a conical spray pattern that has a spray width (W) that corresponds to a control spray width of from 2 to 30 inches measured at a distance (D) of about 10 inches from the spray nozzle (20), as shown in FIG. 8*b*, also using water as a standard. In other embodiments, the spray angle (α) is further defined as corresponding to a control spray angle of from 50 to 80 degrees when measured at a pressure of 10 psi using water as a standard or corresponding to a control spray angle of from 120 to 125 degrees when measured at a pressure of 10 psi using water as a standard, as shown in FIG. 9*b*. In other similar embodiments, the spray angle (α) is further defined as corresponding to a control spray angle of about 60 or 70 degrees when measured at a pressure of 10 psi using water as a standard. The terminology "conical spray pattern" is known to those of skill in the art of nozzle design and is approximately illustrated in FIG. 9*b*. Typically, the conical spray patterns of the instant disclosure are hollow rings of the mixture sprayed from the spray nozzle (20). It is contemplated that the mixture may be sprayed at any spray angle or within any range of spray angles within the ranges set forth above.

In one embodiment, the instant mixture is sprayed with a spray nozzle that is commercially available from Spraying Systems Co. of Wheaton, Ill. having a part number of 5050. In this embodiment, the spray nozzle is rated for flow of 5 gallons of water per minute water at 40 psi, produces a control spray angle of approximately 50°, produces a spray angle of the instant mixture of about 31°, and produces a spray width of the instant mixture of approximately 17 inches when measured at a distance (D) of about 30 inches from the spray nozzle. In another embodiment, the instant mixture is sprayed with a spray nozzle that is commercially available from Spraying Systems Co having a part number of 5070. In this embodiment, the spray nozzle is rated for flow of 5 gallons of water per minute water at 40 psi, produces a control spray angle of approximately 70°, produces a spray angle of the instant mixture of about 35°, and produces a spray width of the instant mixture of approximately 19 inches when measured at a distance (D) of about 30 inches from the spray nozzle. In yet another embodiment, the instant mixture is sprayed with a spray nozzle that is commercially available from Spraying Systems Co. having a part number of 5030. In this embodiment, the spray nozzle is rated for flow of 5 gallons of water per minute water at 40 psi, produces a control spray angle of approximately 30°, produces a spray angle of the instant mixture of about 43°, and produces a spray width of the instant mixture of approximately 24 inches when measured at a distance (D) of about 30 inches from the spray nozzle. In still another embodiment, the instant mixture is sprayed with a spray nozzle that is commercially available from Spraying Systems Co. having a part number of 5015. In this embodiment, the spray nozzle is rated for flow of 5 gallons of water per minute water at 40 psi, produces a control spray angle of approximately 15°, produces a spray angle of the instant mixture of about 47°, and produces a spray width of the instant mixture of approximately 26 inches when measured at a distance (D) of about 30 inches from the spray nozzle.

The spray pattern produced by the spray nozzle, whether flat or conical, is not limited to the above widths and may have different widths as desired by one of skill in the art. As first described above, the actual spray widths measured when spraying the instant mixture through the spray nozzle (20) may be different from the control spray widths described herein due to the viscosity of the mixture as compared to the viscosity of the water standard. In one embodiment, the spray width (W) is related to the spray angle (α) and the spray pressure. However, the spray width (W) may not necessarily be related to the spray angle (α) and/or the spray pressure. The following table sets forth some exemplary, but non-limiting, control spray widths (W) that may be utilized in this disclosure. The following control spray widths are measured at a pressure of 40 psi using water as a standard.

| Control Spray Angle α (°) Using Water as a Standard | Distance (D) From Spray nozzle (inches) at Which Control Spray Width Measured Using Water as a Standard | | | | | |
|---|---|---|---|---|---|---|
| | 6" | 8" | 10" | 12" | 15" | 18" |
| | Control Spray Widths (inches) | | | | | |
| 15 | 1.6 | 2.1 | 2.6 | 3.2 | 3.9 | 4.7 |
| 25 | 2.7 | 3.5 | 4.4 | 5.3 | 6.6 | 8.0 |
| 40 | 4.4 | 5.8 | 7.3 | 8.7 | 10.9 | 13.1 |
| 65 | 7.6 | 10.2 | 12.7 | 15.3 | 19.2 | 22.9 |
| 80 | 10.1 | 13.4 | 16.8 | 20.2 | 25.2 | 30.3 |
| 110 | 17.1 | 22.8 | 28.5 | 34.3 | 42.8 | 51.4 |

In addition to the method, a polyurethane spraying system (hereinafter referred to as the "system") is also provided. A non-limiting schematic of one embodiment the system is set forth in FIG. 12 wherein (A) is one embodiment of a proportioner or mixer of this disclosure, (B) is a heated hose, (C) is a heated whip hose, (D) is a fusion spray gun, (E) is an air line, (F) is a feed pump, (G) is a fluid supply line, and (H) is a fluid inlet. The system is used to minimize emissions of the polyisocyanate while spraying the mixture of the polyisocyanate and the resin composition onto the surface (S). The system includes a first reactant supply tank that includes the resin composition and a second reactant supply tank that includes the polyisocyanate. The first and second reactant supply tanks may be any known in the art such as totes, drums, and tanks, and may be any size and shape. Typically, the first and second reactant supply tanks have a capacity of from 150 pounds to 40,000 pounds. The first and second reactant supply tanks are typically transportable and light-weight such that they can be easily utilized in a variety of applications. Alternatively, the first and second reactant supply tanks may be permanent and not movable. It is also contemplated that the system may include more than two reactant supply tanks. For example, third and fourth, (or more) reactant supply tanks may be utilized and may include additional polyisocyanates, polyols, or additives, in addition to those described above. Typically, the contents of both the first and second reactant supply tanks have a viscosity of less than or equal to about 1200 cps and more typically less than about 600 cps when measured at 70° F.

The system also includes a non-gaseous pump, i.e., a pump that does not utilize a gas to pump, push, or move the contents of the first and second reactant supply tanks. The non-gaseous pump is not particularly limited and may be further defined as a piston pump, an opposed piston metering pump, a double acting piston pump, a pneumatic pump, a direct lift pump, a gravity pump, a hydraulic pump, a positive displacement pump such as a gear pump, a progressive cavity pump, a roots-type pump, a peristaltic pump, a reciprocating-type pump, an impulse pump, a hydraulic ram pump, a velocity pump, a centrifugal pump, a radial flow pump, an axial flow pump, a mixed flow pump, an eductor-jet pump, a steam pump, a valveless pump, a rotary pump, a screw pump, a rotary gear pump, a diaphragm pump, a vane pump, etc.

Typically, the non-gaseous pump is in fluid communication with both the first and second reactant supply tanks and may supply a pressure of from 100-500 psi, of from about 200 to 250 psi, of from about 250 to 500 psi, or of about 235 psi. In one embodiment, the system includes a pumping metering unit that can be operated at a pressure of about 200 to 250 psi.

The system also includes a mixing apparatus (or more than one mixing apparatus), e.g. a proportioner, that is coupled with the first and second reactant supply tanks and coupled with the non-gaseous pump for mixing the resin composition and the polyisocyanate prior to spraying. The mixing apparatus is typically coupled and in fluid communication with the first and second reactant supply tanks via connecting means such as hoses, valves, and/or fluid lines. In one embodiment, the connecting means is heated to a temperature of from 75° F. to 90° F. The mixing apparatus is also typically coupled with the non-gaseous pump via connecting means that may be the same or different from the connecting means described above.

In an alternative embodiment, the one or more mixing apparatus is coupled and in fluid connection with the first and second reactant supply tanks through a ratio control device. The ratio control device may be further defined as a gear box that is used to monitor and control the ratio of the contents of the first and second reactant supply tanks. The one or more mixing apparatus may also be coupled and in fluid connection with the first and second reactant supply tanks through a flow controller. The flow controller and the ratio control device may be coupled and in fluid connection with each other. Typically, the flow controller controls a flow of the contents of the first and second reactant supply tanks.

The mixing apparatus may be further defined as a plural component proportioner, as is known in the art. Suitable, but non-limiting, examples of mixing apparatuses are commercially available from Graco Inc. of Minneapolis, Minn., under the trade names of Reactor E-XP1 and E-XP2, Reactor E-10, Reactor H-XP2 and H-XP3, Reactor H-VR, Guardian A-6, Reactor E-20 and E-30, Reactor E-10, Reactor H-25, H-40 and H-50, Reactor A-20, Guardian A-5, Gusmer H-20/35, Gusmer-Decker Proportioners. Additional non-limiting examples of mixing apparatuses, and more general spray-foam systems that can utilize one or more embodiments of the instant disclosure, include SPRAYTITE 178, ENERTITE NM, ENERTITE US, SPRAYTITE 180, SPRAYTITE 158, and SPRAYTITE 158LDWREV, as set forth in the art. In fact, the mixing apparatuses and general spray-foams systems which may utilize one or more embodiments of the instant disclosure are not particularly limited. The non-gaseous pump of this disclosure may be further defined as a pump of one or more of these apparatuses. The components, designs, orientations, operations, and specifications of each of the aforementioned mixing apparatuses, and the non-gaseous pumps included therein, are expressly contemplated as suitable for use in this disclosure and as optional components in this disclosure. Individual descriptions of each of these components are not included herein for the sake of brevity but nonetheless remain as contemplated non-limiting options for use in this disclosure.

In addition, the system includes the spray nozzle (20), which may be as described above and/or below. The spray nozzle (20) is coupled with the mixing apparatus and minimizes emissions of the polyisocyanate while spraying the mixture onto the surface (S). The spray nozzle (20) is typically further defined as a cone nozzle or a fan nozzle. Particularly suitable cone nozzles include, but are not limited to, full cone nozzles, hollow cone nozzles, and combinations thereof. Particularly suitable fan nozzles include, but are not limited to, flat fan nozzles, flooding fan nozzles, and combinations thereof. Of course, any spray nozzle known in the art may be used with the system so long as the mixture is sprayed as described above and the spray nozzle minimizes the emissions of the polyisocyanate upon spraying.

In addition to the description above, the spray nozzle (20) typically includes a nozzle body (22) having a longitudinal axis (L) and upstream and downstream ends (24, 26) opposite each other, as shown in FIGS. 1-7. The spray nozzle (20) also typically has a passage defined by the nozzle body (22) and in fluid communication with the upstream and downstream ends (24, 26) along the longitudinal axis (L) for receiving the mixture.

The spray nozzle (20) also typically has a spraying orifice (28) defined by the nozzle body (22) and disposed at the downstream end (26) of the nozzle body (22) transverse to the longitudinal axis (L) for spraying the mixture, as also shown in FIGS. 1-7. The spraying orifice (28) may be of any size and shape but typically is circular and has a radius (r) of from about 0.01 to about 0.25 inches.

In one embodiment, the upstream end (24) of the spray nozzle (20) is threaded such that the spray nozzle (20) may be a "male" or "female" nozzle, as is known in the art. Examples of "male" nozzles are illustrated in FIGS. 1a, 1b, 3a, 3b, 5, 6a-6c, and 7a-7c. Examples of "female" nozzles are illustrated in FIGS. 2a, 2b, 4a, and 4b. In another embodiment, the nozzle body (22) has an integrally formed flange (30) extending radially therefrom, as shown in FIGS. 1-7. The integrally formed flange (30) may be disposed between the threaded upstream end (24) and the downstream end (26) for supporting the nozzle body (22) and shown in FIGS. 1a, 1b, 3a, 3b, 5, 6a-6c, and 7a-7c. Typically, the flange (30) has a plurality of flats (32) disposed transverse to the longitudinal axis (L) to allow for threaded engagement of the threaded upstream end (24) to a supply line that provides the mixture of the polyisocyanate and the resin composition to the spray nozzle (20) as shown in FIGS. 1-7. The spray nozzle (20) may also include an insert, such as a stabilizer vane, (not shown in the Figures) to reduce turbulence of the mixture and improve spray pattern efficiency.

In addition, the system may also include any other typical components such as air-bleed valves, water-flushes, air blow offs, filters, and the like. These components may be selected by one of skill in the art and used at any appropriate point in the system. In one embodiment, the system includes a series of regulators and valves. The elements of the spray system can be "coupled" to each other by any means known in the art including piping, tubing, with supply lines, and the like, as selected by one of skill in the art.

EXAMPLES

A mixture (Mixture 1) of a polyisocyanate and a resin composition of this disclosure is formed and is sprayed onto a surface according to the method of this disclosure. A comparative mixture (Comparative Mixture 1) including the same polyisocyanate and a comparative resin composition is also formed and sprayed onto a surface but not according to this disclosure. During spraying, concentrations (i.e., emissions) of the polyisocyanate in the air are measured according to the NIOSH 5521 Impingement Method and reported below.

Formation and Spraying of Mixture 1:

The chemical composition of Mixture 1 is as follows:

Polyisocyanate:

The Polyisocyanate is methylene diphenyl diisocyanate (MDI) that is commercially available from BASF Corporation. The Polyisocyanate is combined with the Resin Composition described below at an Isocyanate Index of about 115.

Resin Composition:

The Resin Composition includes the following wherein the parts by weight are per 100 parts by weight of the Resin Composition:

10 parts by weight of Blowing Agent which is 1,1,1,3,3-pentafluoropropane (HFC R-245fa) that is commercially available from Honeywell under the trade name of Enovate®;

27.25 parts by weight of a Mannich Polyol which is a polyether polyol having a nominal functionality of approximately four, a hydroxyl number of 425 mg KOH/g, and a 20% ethylene oxide cap, and that is commercially available from Carpenter Co. under the trade name of Carpol® MX-425;

33.45 parts by weight of Additional Polyol 1 which is an aromatic polyester polyol having a hydroxyl number of 235-265 mg KOH/g and commercially available from Oxid, Inc. of Houston, Tex. under the trade name Terol® 250;

3 parts by weight of Additional Polyol 2 which is a glycerine/sucrose initiated polyether polyol having a nominal hydroxyl number of 280 mg KOH/g and a nominal functionality of 7 and is commercially available from Carpenter Co. under the trade name Carpol® GSP-280;

0.3 parts by weight of Catalyst 1 which is dimethylethanolamine and is commercially available from Air Products & Chemicals, Inc. under the trade name of DABCO® DMEA;

3 grams of Catalyst 2 which is a solution of 1,4-Diazabicyclo[2.2.2]octane that is commercially available from Air Products & Chemicals, Inc. under the trade name of DABCO® 33LV;

1.5 parts by weight of Catalyst 3 which is a blow catalyst that is polyoxypropylenediamine that is commercially available from Huntsman Corporation under the trade name of D-230;

0.5 parts by weight of Catalyst 4 which is a tin catalyst that is commercially available from Air Products & Chemicals, Inc. under the trade name of DABCO® T;

1 part by weight of Surfactant which is a silicone surfactant that is commercially available from Air Products & Chemicals, Inc. under the trade name of DABCO® DC 193;

10 parts by weight of Additive 1 which is a flame retardant that is triethylphosphate is commercially available from Shanghia Soar Roc under the trade name of TEP;

8 parts by weight of Additive 2 which is a flame retardant that is commercially available from Great Lakes Chemical under the trade name of PHT 4-Diol;

2 parts by weight of deionized water.

After formation, Mixture 1 is sprayed onto a cardboard surface using the method of this disclosure and a flat fan spray nozzle that is commercially available from Spraying Systems Co. under the trade name VeeJet® 4U-4040. This sample is sprayed through the flat fan spray nozzle at a pressure of 250 psi, at a 40 degree spray angle, at a temperature of about 85° F., and at a rate of approximately 9 lbs/minute, using a Graco Fusion type impingement spray gun that is air purged with a AR4242 Module, as known in the art.

More specifically, Mixture 1 is sprayed onto the cardboard surface for approximately 15 minutes. Throughout the 15 minutes, concentrations (i.e., emissions) of the polyisocyanate in the air are measured at two different distance intervals (Distances 1 and 2). The concentrations are measured according to the NIOSH 5521 Impingement Method and are reported as an average in parts per billion of the polyisocyanate in the air. The concentrations are set forth in Table 1 below.

For the instant Examples, a modification of the OSHA method 47, using impingers backed up with 13 mm filters, is used and allows greater sensitivity and capture of the aerosol, both in the impinger and filter, for subsequent analysis of the monomer and three ring oligomer of MDI.

Formation and Spraying of Comparative Mixture 1:

One sample of the Comparative Mixture is also sprayed onto a cardboard surface but is sprayed using a Graco Fusion type impingement spray gun that is air purged with a AR4242 Module, as known in the art. The samples are sprayed using the standard spray foam application configuration at a pressure of 1200 psi, at a temperature of about 130° F., at a rate of approximately 11 lbs/minute, and for a time of about 15 minutes. A spray nozzle of this disclosure is not utilized whatsoever in the spraying of Comparative Mixture 1.

Throughout the 15 minutes, concentrations (i.e., emissions) of the polyisocyanate in the air are measured at two different distance intervals (Distances 1 and 2). The concentrations are measured according to the NIOSH 5521 Impingement Method and are reported as an average in parts per billion of the polyisocyanate in the air. The concentrations are set forth in Table 1 below and in the bar graph of FIG. 13.

TABLE 1

|  | Distance 1 | Distance 2 | Overall Emission |
|---|---|---|---|
| Mixture 1 | 23.3 | 7.5 | 30.8 |
| Comparative Mixture 1 | 59 | 4.17 | 63.17 |
| Total Percent Reduction in Emissions | — | — | −49% |

The reported emissions at Distance 1 are determined approximately 2.5 feet measured perpendicularly from the cardboard surface at a height of approximately 6 feet from ground. The inlet of the monitoring equipment was placed at shoulder height of the individual spraying. In the bar graph of FIG. 13, this distance can alternatively be described as "Personal" distance.

The reported emissions at Distance 2 are determined approximately 10 feet measured perpendicularly from the cardboard surface at a height of 4 feet from the ground. In the bar graph of FIG. 13, this distance can alternatively be described as "Area" distance.

Figure 13:
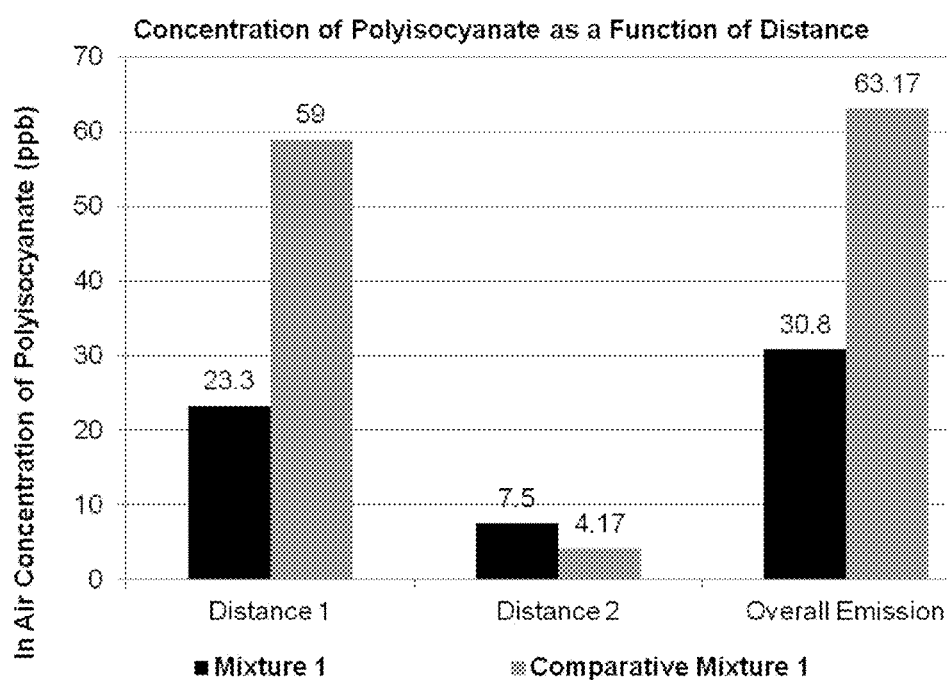
FIG. 13 is a bar graph of the emission measurements set forth in Table 1 of the Examples.

The "Overall Emission" is calculated by summing the emissions from Distances 1 and 2, e.g. from the "Personal" and "Area" distances of FIG. 13.

The results set forth above indicate that use of the system and method of this disclosure significantly decreases emissions and the concentration of the polyisocyanate in the air. The results also indicate that the mixture can be sprayed using this disclosure in closed and/or non-ventilated environments with minimized risk of over exposure to the polyisocyanate. The results further indicate that this method minimizes a need to use respirators and protective equipment when spraying the mixture.

One or more of the values described above may vary by ±5%, ±10%, ±15%, ±20%, ±25%, etc. so long as the variance remains within the scope of the disclosure. Unexpected results may be obtained from each member of a Markush group independent from all other members. Each member may be relied upon individually and or in combination and provides adequate support for specific embodiments within the scope of the appended claims. The subject matter of all combinations of independent and dependent claims, both singly and multiply dependent, is herein expressly contemplated. The disclosure is illustrative including words of description rather than of limitation. Many modifications and variations of the present disclosure are possible in light of the above teachings, and the disclosure may be practiced otherwise than as specifically described herein.

What is claimed is:

1. A polyurethane spraying system used to minimize emissions of a polyisocyanate while spraying a mixture of a polyisocyanate and a resin composition onto a surface at a rate of 5 to 30 lbs/min, said system comprising:
   A. a first reactant supply tank comprising the resin composition having a hydroxyl content of at least 400 mg KOH/g and comprising;
      (i) a blowing agent that is a liquid at room temperature under a pressure greater than atmospheric pressure;
      (ii) a first polyol selected from the group of a Mannich polyol, an autocatalytic polyol, and combinations thereof;
      (iii) at least one additional polyol other than the first polyol;
      (iv) an optional catalyst;
      (v) an optional surfactant, and
      (vi) optionally water, wherein said resin composition has no other blowing agents;
   B. a second reactant supply tank comprising the polyisocyanate;
   C. a non-gaseous pump that is coupled with said first and second reactant supply tanks;
   D. a mixing apparatus that is coupled with said first and second reactant supply tanks for mixing the resin composition and the polyisocyanate prior to spraying;
   E. a spray nozzle that is coupled with said mixing apparatus and that produces less than 50 parts of the polyisocyanate per one billion parts of air according to the National Institute for Occupational Safety and Health 5521 Impingement Method while spraying the mixture onto the surface to form a polyurethane foam, said spray nozzle comprising;
      (i) a nozzle body having a longitudinal axis, upstream and downstream ends opposite each other, and a passage defined by said nozzle body and in fluid communication with said upstream and downstream ends along said longitudinal axis for receiving the mixture; and
      (ii) a circular spraying orifice having a radius of from 0.01 to 0.25 inches and defined by said nozzle body and disposed at said downstream end of said nozzle body transverse to said longitudinal axis for spraying the mixture at a spray angle corresponding to a control spray angle of from 15 to 125 degrees measured at a pressure of from 10 to 40 psi using water as a standard, and
   wherein said spray nozzle produces a flat spray pattern.

2. A polyurethane spray system as set forth in claim 1 wherein the polyurethane foam has a closed cell content of at least 90 percent.

3. A polyurethane spray system as set forth in claim 1 wherein the polyurethane foam is further defined as an open cell foam.

4. A polyurethane spraying system as set forth in claim 1 wherein said non-gaseous pump is further defined as a piston pump.

5. A polyurethane spraying system as set forth in claim 4 wherein said first and second reactant supply tanks are pressurized to a pressure of from about 200 to about 250 psi.

6. A polyurethane spraying system as set forth in claim 5 wherein said mixing apparatus is coupled with said first and second reactant supply tanks via a connecting means that is heated to a temperature of from 90° F. to 100° F.

7. A polyurethane spraying system as set forth in claim 5 wherein said mixing apparatus is coupled with said first and second reactant supply tanks via a connecting means that is heated to a temperature of from 125° F. to 135° F.

8. A polyurethane spraying system as set forth in claim 1 wherein the spray angle is further defined as corresponding to a control spray angle of from 15 to 120 degrees measured at a pressure of 40 psi using water as a standard, wherein the flat spray pattern is substantially planar, and wherein the flat spray pattern has a spray width corresponding to a control spray width of from 2 to 30 inches measured at a distance of about 10 inches from the spray nozzle using water as the standard.

9. A polyurethane spraying system as set forth in claim 8 wherein the spray angle is further defined as corresponding to a control spray angle of 15, 25, 40, 50, 65, 80, 95, 110, or 120 degrees measured at a pressure of 40 psi using water as a standard.

10. A polyurethane spraying system as set forth in claim 1 wherein the spray angle is further defined as corresponding to a control spray angle of from 15 to 125 degrees measured at a pressure of 10 psi using water as a standard.

11. A polyurethane spraying system as set forth in claim 10 wherein the spray angle is further defined as corresponding to a control spray angle of from 50 to 80 degrees measured at a pressure of 10 psi using water as a standard.

12. A polyurethane spraying system as set forth in claim 10 wherein the spray angle is further defined as corresponding to a control spray angle of from 120 to 125 degrees measured at a pressure of 10 psi using water as a standard.

13. A polyurethane spraying system as set forth in claim 1 wherein said spray nozzle that is coupled with said mixing apparatus produces less than 25 parts of the polyisocyanate per one billion parts of air according to the National Institute for Occupational Safety and Health 5521 Impingement Method while measured at horizontal distance of about 2.5 feet from a surface and at a vertical distance of about 6 feet from the ground.

14. A polyurethane spraying system as set forth in claim 13 wherein said spray nozzle that is coupled with said mixing apparatus produces less than 8 parts of the polyisocyanate per one billion parts of air according to the National Institute for Occupational Safety and Health 5521 Impingement Method while measured at horizontal distance of about 10 feet from a surface and at a vertical distance of about 4 feet from the ground.

15. A polyurethane spraying system used to minimize emissions of a polyisocyanate while spraying a mixture of a polyisocyanate and a resin composition onto a surface at a rate of 5 to 30 lbs/min, said system comprising:
   A. a first reactant supply tank pressurized to a pressure of from about 200 to about 250 psi and comprising the resin composition having a hydroxyl content of at least 400 mg KOH/g and comprising;
      (i) a blowing agent that is a liquid at room temperature under a pressure greater than atmospheric pressure;
      (ii) a first polyol selected from the group of a Mannich polyol, an autocatalytic polyol, and combinations thereof;
      (iii) at least one additional polyol other than the first polyol;
      (iv) an optional catalyst;
      (v) an optional surfactant, and
      (vi) optionally water, wherein said resin composition has no other blowing agents;
   B. a second reactant supply tank pressurized to a pressure of from about 200 to about 250 psi and comprising the polyisocyanate;
   C. a piston pump that is coupled with said first and second reactant supply tanks;
   D. a mixing apparatus that is coupled with said first and second reactant supply tanks for mixing the resin composition and the polyisocyanate prior to spraying;
   E. a spray nozzle that is coupled with said mixing apparatus, said spray nozzle comprising:
      (i) a nozzle body having a longitudinal axis, upstream and downstream ends opposite each other, and a passage defined by said nozzle body and in fluid communication with said upstream and downstream ends along said longitudinal axis for receiving the mixture; and
      (ii) a circular spraying orifice having a radius of from 0.01 to 0.25 inches and defined by said nozzle body and disposed at said downstream end of said nozzle body transverse to said longitudinal axis for spraying the mixture at a spray angle corresponding to a control spray angle of from 15 to 125 degrees measured at a pressure of from 10 to 40 psi using water as a standard, and
   wherein said spray nozzle that is coupled with said mixing apparatus produces a flat spray pattern and less than 8 parts of the polyisocyanate per one billion parts of air according to the National Institute for Occupational Safety and Health 5521 Impingement Method while measured at horizontal distance of about 10 feet from a surface and at a vertical distance of about 4 feet from the ground.

16. A polyurethane spraying system as set forth in claim 15 wherein the spray angle is further defined as corresponding to a control spray angle of from 15 to 125 degrees measured at a pressure of 10 psi using water as a standard.

17. A polyurethane spraying system as set forth in claim 16 wherein the spray angle is further defined as corresponding to a control spray angle of from 50 to 80 degrees measured at a pressure of 10 psi using water as a standard.

18. A polyurethane spraying system as set forth in claim 16 wherein the spray angle is further defined as corresponding to a control spray angle of from 120 to 125 degrees measured at a pressure of 10 psi using water as a standard.

19. A polyurethane spraying system as set forth in claim 15 wherein said mixing apparatus is coupled with said first and second reactant supply tanks via a connecting means that is heated to a temperature of from 90° F. to 100° F.

20. A polyurethane spraying system as set forth in claim 15 wherein said mixing apparatus is coupled with said first and second reactant supply tanks via a connecting means that is heated to a temperature of from 125° F. to 135° F.

21. A polyurethane spraying system as set forth in claim 1 wherein said spray nozzle is rated for flow of 5 gallons of water per minute water at 40 psi, produces a control spray angle of approximately 50°, produces a spray angle of said mixture of about 31°, and produces a spray width of said mixture of approximately 17 inches when measured at a distance (D) of about 30 inches from said spray nozzle.

* * * * *